(12) United States Patent
Anderson et al.

(10) Patent No.: US 12,073,238 B2
(45) Date of Patent: Aug. 27, 2024

(54) INTELLIGENT USER INTERFACE AND COMPUTER FUNCTIONALITY FOR OVERFLY AND LANDING CHARGE AUDITING

(71) Applicant: UNITED PARCEL SERVICE OF AMERICA, INC., Atlanta, GA (US)

(72) Inventors: Roman Anderson, Atlanta, GA (US); Andrew Nguyen Vo, Atlanta, GA (US); Balakrishna Subramaniam, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/091,182

(22) Filed: Dec. 29, 2022

(65) Prior Publication Data

US 2024/0220285 A1 Jul. 4, 2024

(51) Int. Cl.
*G06F 9/451* (2018.01)
*G06F 40/103* (2020.01)
*G06F 40/126* (2020.01)

(52) U.S. Cl.
CPC ............ *G06F 9/451* (2018.02); *G06F 40/103* (2020.01); *G06F 40/126* (2020.01)

(58) Field of Classification Search
CPC .......... G06F 9/451; G06F 9/103; G06F 9/126; G06F 40/103; G06F 40/126
USPC ...................................................... 715/764
See application file for complete search history.

(56) References Cited

U.S. PATENT DOCUMENTS

| | | | | |
|---|---|---|---|---|
| 5,418,865 A * | 5/1995 | Bloomberg | ............ | G06V 10/22 235/456 |
| 6,038,540 A * | 3/2000 | Krist | ................ | G06Q 10/06375 705/7.29 |
| 7,715,045 B2 * | 5/2010 | Sussmeier | ............. | G06F 40/194 358/1.9 |
| 8,352,855 B2 * | 1/2013 | Levy | ..................... | G06F 40/174 715/276 |
| 10,191,889 B2 * | 1/2019 | Nguyen | ................ | G06F 40/103 |
| 10,572,725 B1 * | 2/2020 | Becker | ................ | G06F 18/2413 |
| 10,635,413 B1 * | 4/2020 | Krishnamoorthy | ....... | G06T 7/11 |
| 10,902,952 B2 * | 1/2021 | Lucas | ..................... | G16H 50/70 |
| 10,922,342 B2 * | 2/2021 | Wang | ..................... | G06N 20/00 |
| 11,256,732 B2 | 2/2022 | Weiss et al. | | |
| 11,354,485 B1 * | 6/2022 | O'Gorman | ............. | G06N 20/00 |
| 11,657,419 B2 * | 5/2023 | Eder | .................. | G06Q 30/0205 345/418 |
| 11,810,380 B2 * | 11/2023 | Arroyo | .................. | G06N 3/045 |

(Continued)

OTHER PUBLICATIONS

European search report received for European Application No. 23218051.3, mailed on Apr. 29, 2024, 9 pages.

*Primary Examiner* — Tadesse Hailu
(74) *Attorney, Agent, or Firm* — Shook, Hardy & Bacon L.L.P.

(57) ABSTRACT

Particular embodiments are directed to automatically determining whether first values—corresponding to overflight/landing charges—indicated in a document exceed a threshold associated with second charges—corresponding to expected overflight/landing charges—and then causing presentation, at a single page of a user interface, of one or more user interface elements that at least partially indicate whether the threshold has been exceeded.

20 Claims, 17 Drawing Sheets

(56) References Cited

U.S. PATENT DOCUMENTS

| | | | | |
|---|---|---|---|---|
| 2006/0195383 | A1* | 8/2006 | Masuda | G06Q 40/04 |
| | | | | 705/37 |
| 2008/0040162 | A1* | 2/2008 | Brice | G16H 15/00 |
| | | | | 705/2 |
| 2008/0040167 | A1* | 2/2008 | Ackerman | G06Q 10/02 |
| | | | | 705/5 |
| 2009/0094011 | A1* | 4/2009 | Griffin | G06Q 40/12 |
| | | | | 705/400 |
| 2011/0276946 | A1* | 11/2011 | Pletter | G06F 11/3688 |
| | | | | 717/124 |
| 2013/0174011 | A1* | 7/2013 | Le Chevalier | G06F 16/84 |
| | | | | 715/234 |
| 2015/0205710 | A1* | 7/2015 | Zhang | G06F 11/3688 |
| | | | | 717/124 |
| 2017/0083481 | A1* | 3/2017 | Nikitin | G06F 40/103 |
| 2017/0323274 | A1* | 11/2017 | Johnson | G05B 13/041 |
| 2017/0351913 | A1 | 12/2017 | Chen et al. | |
| 2017/0371941 | A1* | 12/2017 | Abedini | H04L 67/535 |
| 2018/0011627 | A1* | 1/2018 | Siracusano, Jr. | G06F 3/04845 |
| 2018/0276459 | A1* | 9/2018 | Kojima | G06V 30/416 |
| 2019/0333171 | A1* | 10/2019 | Tokhtabaev | G06Q 30/0641 |
| 2019/0361466 | A1* | 11/2019 | Obropta, Jr | B64F 5/60 |
| 2020/0159820 | A1* | 5/2020 | Rodriguez | G06F 40/137 |
| 2020/0211069 | A1* | 7/2020 | Chaubey | G08G 5/0021 |
| 2020/0226364 | A1* | 7/2020 | Gehler | G06Q 50/14 |
| 2020/0290742 | A1* | 9/2020 | Kumar | B64D 27/24 |
| 2020/0380162 | A1* | 12/2020 | Eisen | H04N 1/00872 |
| 2021/0004147 | A1* | 1/2021 | Gurule | G06F 9/451 |
| 2021/0286931 | A1* | 9/2021 | Summerbell | G09B 17/02 |
| 2021/0295822 | A1* | 9/2021 | Tomkins | G06F 16/90332 |
| 2021/0342723 | A1 | 11/2021 | Rao | |
| 2021/0366170 | A1* | 11/2021 | Yin | G06F 40/126 |
| 2022/0028287 | A1* | 1/2022 | Durant | G06N 20/00 |
| 2022/0083907 | A1* | 3/2022 | Singh | G06N 20/00 |
| 2022/0188885 | A1 | 6/2022 | Blackman et al. | |
| 2022/0229969 | A1* | 7/2022 | Kukla | G06V 10/762 |
| 2022/0254257 | A1* | 8/2022 | Urbanec | G08G 5/003 |
| 2022/0284172 | A1* | 9/2022 | Rebo | G06N 3/0455 |
| 2022/0374249 | A1* | 11/2022 | Nair | G06Q 10/10 |
| 2023/0015846 | A1* | 1/2023 | Toffey | G06V 30/42 |
| 2023/0096163 | A1* | 3/2023 | Narayanam | G06Q 30/04 |
| | | | | 705/7.25 |

* cited by examiner

Nav Invoice Exception Analyzer    Planned Nav Charge Lookup

≡ Nav Invoice Audit

① Validate Invoice — ② Choose Parameters

| Start Date * | End Date * | Country | Airspace | Charge Type | Cost Variance Limit | ☐ USD Invoice Mode |
| 1/1/2021 | 11/30/2021 | | | All | 10 % | |
| 302 | 304 | 306 | 308 | 309 | 310 | 312 |

☐ Toggle Entry Filter
[Clear] [Analyze] — 314

Invoice Charge Count: 1463 — 210

| UTC Date | Flight | Tail | Origin | Destination | Charge Type | Service Charge |
|---|---|---|---|---|---|---|
| 01/1/21 | UPS123 | - | EDDK | EGSS | - | 660.91 |
| 01/1/21 | UPS456 | - | EDDK | KEWR | - | 1617.34 |
| 01/1/21 | UPS789 | - | EGNX | EDDK | - | 752.96 |
| 01/1/21 | UPS234 | - | EDDK | ESSA | - | 1331.88 |
| 01/1/21 | UPS445 | - | EDDK | ESMS | - | 777.09 |
| 01/1/21 | UPS345 | - | EDDK | LEMD | - | 1572.73 |
| 01/1/21 | UPS678 | - | EDDK | LIPZ | - | 852.8 |
| 01/1/21 | UPS334 | - | EDDK | LOWW | - | 889.67 |

| | | Nav Invoice Exception Analyzer | Planned Nav Charge Lookup | | | | | | |
|---|---|---|---|---|---|---|---|---|---|

≡ Nav Invoice Audit

① Validate Invoice — ② Choose Parameters

Start Date * 11/1/2021 — End Date * 11/30/2021 — Country — Airspace EUROCONTROL — Charge Type All — Cost Variance Limit 10 %

314 — Toggle Entry Filter — Start Entry Date 11/1/2021 — Start Entry Time 00:00 — End Entry Date 11/30/2021 — End Entry Time 23:59 — ☐ USD Invoice Mode

316 — 318 — 320 — 322

☐ Match Invoice Dates to LIDO Entry Dates — 324

Clear — Analyze

326 — 328

Invoice Charge Count: 1483

| UTC Date | Flight | Tail | Origin | Destination | Charge Type | Service Charge |
|---|---|---|---|---|---|---|
| 01/1/21 | UPS123 | - | EDDK | EGSS | - | 660.91 |
| 01/1/21 | UPS456 | - | EDDK | KEWR | - | 1617.34 |
| 01/1/21 | UPS789 | - | EGNX | EDDK | - | 752.96 |
| 01/1/21 | UPS881 | - | EDDK | ESSA | - | 1331.88 |
| 01/1/21 | UPS882 | - | EDDK | ESMS | - | 777.09 |
| 01/1/21 | UPS734 | - | EDDK | LEMD | - | 1572.73 |
| 01/1/21 | UPS634 | - | EDDK | LIPZ | - | 852.8 |

| Country | Provider | Airspace | Type | Entry Trn (Z) | Flight # | Status | Ops Dt (Z) | Org | Sch Dest | Tail | Entry | Exit | Local Currency | Cost Local | Cost USD |
|---|---|---|---|---|---|---|---|---|---|---|---|---|---|---|---|
| Ireland | E | Eurocontrol/Ireland | E | 12/14/21 14:29 | UPS123 | SKD | 12/14/21 | KSDF | EDDK | XJFP | DINIM | EVRIN | EUR | 493.3213 | 556.94 |
| United Kingdom | E | Eurocontrol/United Kingdom | E | 12/14/21 14:29 | UPS123 | SKD | 12/14/21 | KSDF | EDDK | XJFP | DINIM | EVRIN | EUR | 493.3213 | 556.94 |
| Ireland | E | Eurocontrol/Ireland | E | 12/14/21 14:29 | UPS123 | SKD | 12/14/21 | KSDF | EDDK | XJFP | DINIM | EVRIN | EUR | 493.3213 | 556.94 |
| Ireland | E | Eurocontrol/Ireland | E | 12/14/21 14:29 | UPS123 | SKD | 12/14/21 | KSDF | EDDK | XJFP | DINIM | EVRIN | EUR | 493.3213 | 556.94 |
| Belgium | E | Eurocontrol/Belgium | E | 12/14/21 14:29 | UPS123 | SKD | 12/14/21 | KSDF | EDDK | XJFP | DINIM | EVRIN | EUR | 493.3213 | 556.94 |
| United Kingdom | E | Eurocontrol/United Kingdom | E | 12/14/21 14:29 | UPS123 | SKD | 12/14/21 | KSDF | EDDK | XJFP | DINIM | EVRIN | EUR | 493.3213 | 556.94 |
| Germany - Civil | E | Eurocontrol/Germany | E | 12/14/21 14:29 | UPS123 | SKD | 12/14/21 | KSDF | EDDK | XJFP | DINIM | EVRIN | EUR | 493.3213 | 556.94 |
| France | E | Eurocontrol/France | E | 12/14/21 14:29 | UPS123 | SKD | 12/14/21 | KSDF | EDDK | XJFP | DINIM | EVRIN | EUR | 493.3213 | 556.94 |
| United Kingdom | E | Eurocontrol/United Kingdom | E | 12/14/21 14:29 | UPS123 | SKD | 12/14/21 | KSDF | EDDK | XJFP | DINIM | EVRIN | EUR | 493.3213 | 556.94 |
| Belgium | E | Eurocontrol/Belgium | E | 12/14/21 14:29 | UPS123 | SKD | 12/14/21 | KSDF | EDDK | XJFP | DINIM | EVRIN | EUR | 493.3213 | 556.94 |
| Switzerland | E | Eurocontrol/Switzerland | E | 12/14/21 14:29 | UPS123 | SKD | 12/14/21 | KSDF | EDDK | XJFP | DINIM | EVRIN | EUR | 493.3213 | 556.94 |
| Germany - Civil | E | Eurocontrol/Germany | E | 12/14/21 14:29 | UPS123 | SKD | 12/14/21 | KSDF | EDDK | XJFP | DINIM | EVRIN | EUR | 493.3213 | 556.94 |
| Italy | E | Eurocontrol/Italy | E | 12/14/21 14:29 | UPS123 | SKD | 12/14/21 | KSDF | EDDK | XJFP | DINIM | EVRIN | EUR | 493.3213 | 556.94 |
| Greece | E | Eurocontrol/Greece | E | 12/14/21 14:29 | UPS123 | SKD | 12/14/21 | KSDF | EDDK | XJFP | DINIM | EVRIN | EUR | 493.3213 | 556.94 |
| Ireland | E | Eurocontrol/Ireland | E | 12/14/21 14:29 | UPS123 | SKD | 12/14/21 | KSDF | EDDK | XJFP | DINIM | EVRIN | EUR | 493.3213 | 556.94 |
| United Kingdom | E | Eurocontrol/United Kingdom | E | 12/14/21 14:29 | UPS123 | SKD | 12/14/21 | KSDF | EDDK | XJFP | DINIM | EVRIN | EUR | 493.3213 | 556.94 |
| Ireland | E | Eurocontrol/Ireland | E | 12/14/21 14:29 | UPS123 | SKD | 12/14/21 | KSDF | EDDK | XJFP | DINIM | EVRIN | EUR | 493.3213 | 556.94 |
| Ireland | E | Eurocontrol/Ireland | E | 12/14/21 14:29 | UPS123 | SKD | 12/14/21 | KSDF | EDDK | XJFP | DINIM | EVRIN | EUR | 493.3213 | 556.94 |
| Belgium | E | Eurocontrol/Belgium | E | 12/14/21 14:29 | UPS123 | SKD | 12/14/21 | KSDF | EDDK | XJFP | DINIM | EVRIN | EUR | 493.3213 | 556.94 |

Invoice Exception Analysis | EUROCONTROL NOV 2021

| Total Invoice Charges | Total Invoice Local Cost | Total Invoice Cost Variance | | Total FPS Charges | Total FPS Local Cost | Total FPS USD Cost |
|---|---|---|---|---|---|---|
| 1483 | 2,179,993.99 | -1.00% | | 1481 | 2,201,818.91 | $645,476.15 |

| Total Issues | Duplicate | Reinvoice | Cost | Month | Flight | Tail | Car | Missing | No Issue |
|---|---|---|---|---|---|---|---|---|---|
| 150 | 0 | 0 | 57 | 0 | 35 | 0 | 0 | 56 | 1354 |

| Invoice UTC Date | Invoice Flight | Invoice Tail | Invoice Origin | Invoice Dest | Invoice Charge Type | Invoice Service Charge (Local) | Exception | Cost +- | FPS Airspace | FPS Type | FPS Entry Tm (Z) | FPS Exit Tm (Z) | FPS Flight | FPS Status | FPS Cos Dt(Z) | FPS Org | FPS Sch Dest | FPS Tail | FPS Local Currency | FPS Cost Local | FPS Cost USD | Comments | Closed |
|---|---|---|---|---|---|---|---|---|---|---|---|---|---|---|---|---|---|---|---|---|---|---|---|
| 11/01/21 | UPS123 | - | EGSS | EDDK | - | 604.67 | COST | -14.44% | BUK,EN,EG | E | 11/01/21 23:59 | 11/02/21 00:13 | UPS0235 | ARR | 11/01/21 | EGSS | EDDK | XJFP | EUR | 691.996 | 180.82 | Valid | CLOSED |
| 11/01/21 | UPS456 | - | EGNX | EDDK | - | 752.96 | COST | -40.24% | BUK,EN,EG | E | 11/01/21 01:40 | 11/01/21 02:04 | UPS0239 | - | 11/01/21 | EGNX | EDDK | XJFP | EUR | 830.1165 | 362.17 | - | - |
| 11/01/21 | UPS789 | - | KSDF | EDDK | - | 2486.07 | FLIGHT | - | BUK,EN,EG | E | 11/01/21 15:53 | 11/01/21 16:59 | UPS0223 | ARR | 11/01/21 | KSDF | EDDK | ZPP | EUR | 2606.827424141.28 | | - | - |

INTELLIGENT USER INTERFACE AND COMPUTER FUNCTIONALITY FOR OVERFLY AND LANDING CHARGE AUDITING

BACKGROUND

Overfly auditing technologies are computer-based applications or models that are used to compute whether particular overfly charges or landing charges in an invoice fall within an acceptable range. An "overfly charge" is a cost for an aircraft to fly through a particular country's airspace. A "landing charge" is a cost for an aircraft to land in a particular country. Existing overfly auditing technologies are not intelligently automated, have rigid invoice formatting requirements, employ static user interfaces, and negatively impact storage device input/output (I/O), among other technical problems.

Existing document processing technologies are configured to process natural language characters in documents (e.g., digital books, letters, etc.). For example, particular natural language processing (NLP) machine learning models can determine the semantic meaning of words in a natural language sentence of a document. However, these models and other technologies fail to detect or extract specific fields of overflight auditing invoices, which may be required to perform downstream overfly auditing analyses.

BRIEF SUMMARY

Particular embodiments of the present disclosure include a computer-implemented method, a non-transitory computer storage medium, and a computerized system. Some embodiments are directed to automatically determining whether first values (corresponding to overflight/landing charges) indicated in a converted document (e.g., a machine-readable invoice) exceed a threshold associated with second charges (corresponding to expected overflight/landing charges), and then causing presentation, at a single page of a user interface, of one or more user interface elements that at least partially indicate whether the threshold has been exceeded.

In some embodiments, the computerized system comprises one or more processors and computer storage memory having computer-executable instructions stored thereon which, when executed by the one or more processors, implement operations comprising the following steps. A document is received in a first format. The document includes one or more fields and a first set of one or more values associated with the one or more fields. The one or more fields being represented in natural language. The first set of one or more values including a charge for at least one of: an aircraft to fly, in airspace, over a particular country or for the aircraft to land in the particular country. The document is converted into a machine-readable bitmap image. At least partially in response to the converting, each field and value is detected at the machine-readable bitmap image. Based at least in part on the detecting, the one or more values are extracted from the bitmap image and a data structure is encoded with the one or more values. Based at least in part on the encoding, a second document with the one or more values is generated, where the second document is in a second format. Based at least in part on the generating, these embodiments determine, by comparing the first set of one or more values of the second document to a second set of one or more values, whether the first set of one or more values exceeds a threshold associated with the second set of one or more values. The second set of one or more values includes one or more expected charges associated with the document. At least partially in response to the determining, a first user interface element that indicates whether the first set of one or more values exceeds the threshold is caused to be generated at a single page of a user interface.

In some embodiments, the computer-implemented method includes the following operations. A first document is received in a first format. The first document includes one or more fields and a first set of one or more values associated with the one or more fields. The one or more fields being represented in natural language. The first set of one or more values including a charge for at least one of: an aircraft to fly, in airspace, over a particular country or for the aircraft to land in the particular country. The first document is converted in the first format to a second document in a second format. Subsequent to the converting, these embodiments determine, by comparing the first set of one or more values of the second document to a second set of one or more values, whether the first set of one or more values exceeds a threshold associated with the second set of one or more values. The second set of one or more values includes one or more expected charges for the aircraft to fly over the particular country or land in the particular country. At least partially in response to the determining, a plurality of user interface elements are caused to be generated at a single page of a user interface.

In some embodiments, the one or more computer storage media includes computer-executable instructions embodied thereon that, when executed, by one or more processors, cause the one or more processors to perform the following operations. A document is received in a first format. The document includes one or more fields and a first set of one or more values associated with the one or more fields. The one or more fields being represented in natural language. The first set of one or more values including a charge for at least one of: an aircraft to fly, in airspace, over a particular country or for the aircraft to land in the particular country. At least partially in response to the receiving, each field of the one or more fields and each value, of the one or more values is detected. Based at least in part on the detecting, the one or more values are extracted from the document and a data structure is encoded with the one or more values. Based at least in part on the encoding, these embodiments determine, by comparing the first set of one or more values to a second set of one or more values, whether the first set of one or more values exceeds a threshold associated with the second set of one or more values. The second set of one or more values indicates one or more expected charges associated with the aircraft. At least partially in response to the determining, a plurality of user interface elements are caused to be generated at a single page of a user interface. At least a first user interface element indicates whether the first set of one or more values exceeds the threshold.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 3A is a screenshot of an example user interface illustrating particular parameters that a user can select for filtering results performed by the document exception analyzer of FIG. 1, according to some embodiments;

FIG. 3B is a screenshot of an example user interface that is presented in response to receiving an indication that the user has selected the "toggle entry filter" button of FIG. 3A, according to some embodiments;

FIG. 4A is a screenshot of an example single page of a user interface that presents an example analysis provided by the document exception analyzer of FIG. 1, according to some embodiments;

FIG. 4B is a screenshot of an example user interface illustrating more details with respect to the "comments" feature and the "closed" feature of FIG. 4A, according to some embodiments;

FIG. 6B is a screenshot of an example user interface illustrated how search results associated with expected charges are surfaced, according to some embodiments;

FIG. 7A is a screenshot of an example interface for exporting analysis results to a particular file format, according to some embodiments;

FIG. 7B is a screenshot of an example user interface for exporting document exception analyses into a PDF format, according to some embodiments;

FIG. 7C is a screenshot of an example user interface for exporting planned charged lookup analyses into an EXCEL format, according to some embodiments;

DETAILED DESCRIPTION

Figure 1:
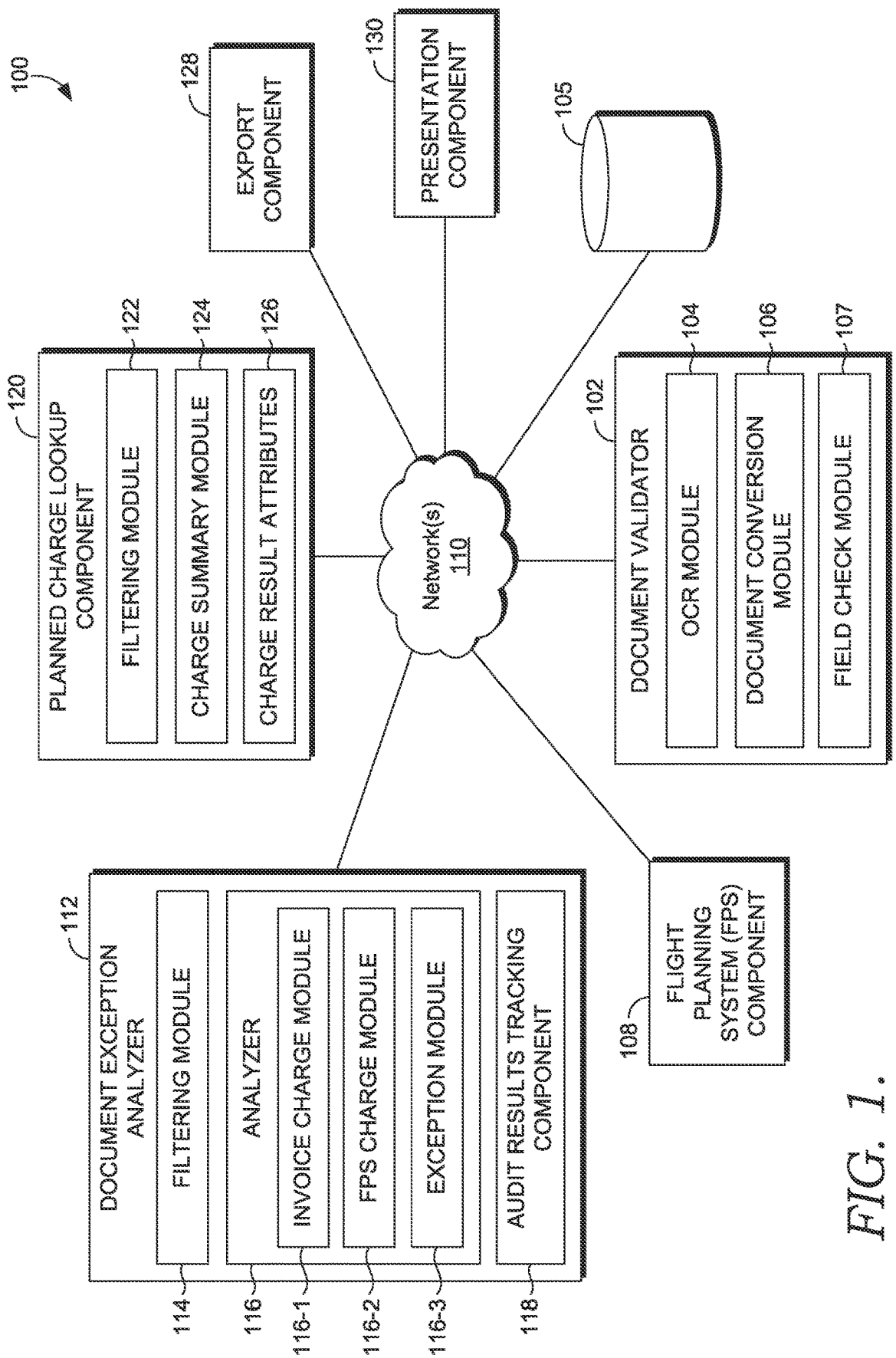
FIG. 1 is a block diagram of an illustrative system architecture, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described

I. Overview

Existing technologies employ static functionality that leads to inaccuracies and extensive manual user input. Entities, such as logistics companies, must pay for an aircraft to fly in a particular country's airspace (overfly charges) and/or pay for the aircraft to land in a particular country (landing charges). With respect to most overfly auditing technologies, they require the user to manually compare various fields and values of an invoice of particular overfly or landing charges with flight system data (i.e., actual flight data that indicates expected overfly or expected landing charges) and then input that information into an electronic spreadsheet or fields of an overfly auditing application, which may perform additional computational analyses. These technologies may then output invoice charge data and expected charges. In some instances, these technologies require the users themselves to identify discrepancies between the actual invoices and the expected charges. However, this leads to inaccuracies due to either human error in calculation or because overfly auditing technologies fail to employ any tolerance or thresholds to mark such discrepancies. For example, these technologies may simply provide a displayed output of expected charges and actual invoice charges without any indication of a discrepancy between the two. The user must then manually calculate the difference between the two charges, which is tedious. Further, these technologies lack datasets that offer a more complete picture of overfly and landing charges to perform a robust audit. For example, these technologies fail to allow users to filter computational results via selection of unique parameters, such as: an airspace indicator, a charge type indicator, a cost variance limit, etc., which is described in more detail below.

Some overfly auditing technologies also employ static user interfaces, which requires tedious computer manual user input. For example, some overfly auditing user interfaces require extensive drilling, paging, dragging, or querying to locate different analyses. For instance, in order to view the total charge or cost indicated in an invoice, the user must drill down to a first page from a landing page. In order to view the total expected charge or cost, the user must drill down to a second page from the first page, and in order to view any historical flight data, the user must drill down to a third set of pages from the second page. This makes user navigation of the user interface tedious, and negatively impacts the user experience.

Some overfly auditing technologies require the user to upload invoices in a particular format, which causes unnecessary computer user input and computer storage device input/output (I/O). For example, some overfly auditing technologies require the user to upload a PDF version of an invoice. However, not all invoices are generated in such format. Accordingly, this requires the user to manually request operating system dialogue boxes or fly out windows in order to select a file, and then make manual selections to then convert the file to the PDF. Moreover, some formats are not convertible at all. Such manual computer user input (as well as any of the excessive manual user input described herein) leads to repetitive I/O costs (e.g., excess physical read/write head movements on non-volatile disk) because each time an operating system or other component processes a user request, the computing system has to reach out to the storage device to perform a read or write operation, which is time consuming, error prone, and eventually wears on components, such as a read/write head.

As described above, although some back-end document processing technologies call remote natural language processing (NLP) services in order to determine the semantic meaning of words in a natural language sentence of a document, these technologies fail to parse or detect specific fields of data particular to an auditing overflight document, such as an invoice, where specific fields may be required to perform an analysis. For example, existing OCR and NLP-based technologies fail to detect specific fields and corresponding values because they have not been fine-tuned or trained to learn such specific fields and values. Rather, their pre-training data set is based on ingesting generic documents, such as dictionaries, encyclopedias, and the like.

Various embodiments of the present disclosure provide one or more technical solutions to one or more of these technical problems (or others) described above. In operation, particular embodiments of the present disclosure are directed to automatically determining whether first values (corresponding to overflight/landing charges) indicated in a converted document (e.g., a machine-readable invoice) exceed a threshold associated with second charges (corresponding to expected overflight/landing charges), and then causing presentation, at a single page of a user interface, of one or more user interface elements that at least partially indicate whether the threshold has been exceeded.

Particular embodiments improve the functionality of existing overfly auditing technologies by improving accuracy and automating functionality based on one or more unique rules. Instead of a user having to manually compare various fields and values of an invoice with flight system data and then inputting data to an electronic spreadsheet or other field, particular embodiments provide a technical solution by automatically comparing charge values (e.g., overfly or landing charges) with expected charge values and automatically determining whether the charge values exceed a threshold (e.g., based on a first rule, such as a tolerance percentage). In this way, users do not have to perform extra manual user input into an electronic spreadsheet or other field, as well as manually identify discrepancies between documents (e.g., invoices) and expected charges. In other words, there is less likely to be human error and higher accuracy in identifying discrepancies between actual invoices and expected charges because the user does not have to (and often cannot) perform these computations. Moreover, these embodiments employ tolerance or thresholds to mark discrepancies. For example, particular embodiments flag (e.g., superimpose visual data over values) particular flights based on a first rule where the difference between actual and expected charges are greater than 10%. Accordingly, instead of the user or other outside application, such as an electronic spreadsheet, simply providing a displayed output of expected charges and actual invoice charges without any indication of a discrepancy between the two, these embodiments automatically determining whether the charge values exceed a threshold and cause presentation of such indication at a user interface, which improves the accuracy in identifying discrepancies.

Further, particular embodiments improve these overfly auditing technologies by implementing datasets that offer a more complete picture of overfly and landing charges to perform a robust audit, thereby improving the user experience and accuracy. For example, these embodiments allow users to filter computational results via selection of unique parameters, such as: an airspace indicator, a charge type indicator, a cost variance limit, a start date/end date indicator, a country indicator, and the like, which is described in more detail below. Accordingly, another technical solution is the computation and presentation of data in response to a user selection of one or more of these parameters.

Particular embodiments also improve overfly auditing technology user interfaces because they reduce the amount of tedious computer manual user input. Instead of a requiring extensive drilling, paging, dragging, or querying to locate different analysis, particular embodiments provide another technical solution by causing presentation of multiple user interface elements to a single page of a user interface. For instance, in order to view the total charge indicated in an invoice, the total expected charge, historical flight data, and the like, in some embodiments this information (as well as others) is presented to a single page of a user interface, such that the user does not have to drill down to various pages to locate the information. In some embodiments, such technical solution includes a user interface page (and corresponding information) as indicated in the screenshot 400 of FIG. 4A, as described in more detail below.

Some embodiments improve overfly auditing technologies because they process documents regardless of the format they are originally uploaded in. Accordingly, another technical solution is the automatic converting of a first document to a second document (or any other related functionality), such as converting the first document into a bitmap image, extracting values from the bitmap image or document, encoding a data structure for the generation of the second document). Such functionality reduces unnecessary computer input and computer storage device I/O. This is because these embodiments do not require the user to upload invoices in a particular format. Rather, these embodiments automatically perform such conversion (e.g., from a PDF format to a comma-delimited file of type comma-separated values (.CSV)). Accordingly, the user does not have to manually request operating system dialogue boxes or fly out windows in order to select a file, and then make manual selections to then convert the file to the PDF. Rather, particular embodiments automatically perform document conversion regardless of the format. Therefore, such reduction in manual computer user input (as well as any of the excessive manual user input described herein) leads to reduced I/O costs (e.g., reduced physical read/write head movements on non-volatile disk) because the user's computing system does not have to reach out to the storage device to perform a read or write operation, which is less error prone, and decreases wear on components, such as a read/write head.

Some embodiments also improve back-end document processing technologies by being able to detect specific fields and/or corresponding values of an auditing overflight invoice document. In some embodiments, specific fields (e.g., attributes or columns) should be present in a document in order to validate an invoice and perform downstream analyses. Accordingly, another technical solution is the ability to detect specific natural language fields and/or corresponding values in a document. For example, particular embodiments can validate an invoice document by determining whether each field in the document is semantically similar, via a distance measurement, to a predetermined field based on specialized training or fine-tuning of a model by using various auditing overflight invoice documents as training data. For example, particular embodiments can detect that the term "tail" refers to an identifier of a particular aircraft based on fine-tuning on various historical invoices where this term is labeled as an aircraft identifier. Existing models, however, would likely predict that the term "tail"

refers to an appendage of an animal or other definition because its training data is generic. Further, other invoices may not use the term "tail" but other identifiers, such as "aircraft ID" and the like. In these situations, particular embodiments can map both "tail" and "aircraft ID" to the same semantic vector space in order to validate the invoice, which existing technologies cannot do. Moreover, some embodiments can also determine that specific values belong to specific fields based on particular rules, such as distance measurements between field and value, the field and value being within an alignment threshold, and the like. Existing document processing technologies cannot perform such functionality.

II. Example System Architecture

FIG. 1 is a block diagram of an illustrative system architecture 100 in which some embodiments of the present technology are employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., various analysis computing entities 05 of FIG. 9). In other embodiments, the system 100 is located at a single host or computing device (e.g., a single analysis computing entity, as illustrated in FIG. 10). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture. In Some embodiments, the solutions described herein are implemented via a SAAS that logistics entities (e.g., UPS) provide for other airlines (e.g., commercial airlines) for monetization.

The system 100 is generally directed to automatically determining whether first values (corresponding to overflight/landing charges) indicated in a document exceed a threshold associated with second charges (corresponding to expected overflight/landing charges), and then causing presentation, at a single page of a user interface, of one or more user interface elements that at least partially indicate whether the threshold has been exceeded.

The system 100 includes a document validator 102, a flight planning system (FPS) component 108, a document exception analyzer 112, a planned charge lookup component 120, an export component 128, a presentation component 130, and storage 105, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 100.

The document validator 102 is generally responsible for preprocessing a document and determining whether the preprocessed document meets certain validation criteria. The document validator 102 includes an Optical Character Recognition (OCR) module 104, a document conversion module 106, and a field check module 107. The OCR module 104 is generally responsible for detecting natural language characters (e.g., words and numbers) at a document and converting such characters into a machine-readable format so that further analysis can occur with respect to the document exception analyzer 112 and the planned charge lookup component 120. A "document" as described herein refers to digital image or other data object that contains one or more natural language characters, such as numbers, English words, or English phrases.

In some instances a document represents or first exists as real world paper/document or other medium, which has been copied or scanned, via the OCR module 104, in order for the OCR module 104 to perform the rest of its functionality. In some embodiments, a document refers to entire object or set of pages that are associated with or belong to a particular event (e.g., a work duty job or series of tasks) or entity (e.g., a company). Each document, however, can have multiple pages. For example, invoice A (which has 5 ages) from Company B can be uploaded and invoice C (which has 10 pages) from company D can be uploaded. In this example, there are only two documents-invoice A and invoice C, even though both have multiple pages.

In some embodiments, a processor executing the OCR module 104 may first convert (e.g., via PymuPDF) one or more raw documents into another format in preparation for further processing by the OCR module 104. For example, the OCR module 104 may convert any document (e.g., a JPEG document) that is not an image into an image (e.g., a bitmap image) of black and white pixel values, where the dark areas are identified as characters that need to be recognized and light areas are identified as background). Often, information is difficult to extract in certain formats (e.g., JPEG) and/or the original formats consume unnecessary computer memory resources. Accordingly, data may be converted from one format to another in order to extract all features of a document, save on memory resources, and the like all while maintaining high image quality. For example, the OCR module 104 can automatically convert a PDF document of several pages into an image file output format (e.g., .jpg, .png, .bmp, .tiff, etc.), such as via a PDF-to-JPG converter. JPEG, for example, is a file format that can contain image with 4:1 to 10:1 lossy image compression technique via conversion. With this compression technique embodiments can reduce the image size of images contained within PDF documents without losing the image quality.

In some embodiments, the OCR module 104 additionally or alternatively performs image quality functionality to change the appearance of the document by converting a color document to greyscale, performing desaturation (removing color), changing brightness, and changing contrast for contrast correctness, and the like. Responsively, the OCR module 104 can perform a computer process of rotating the document image to a uniform orientation, which is referred to as "deskewing" the image. From time to time, user-uploaded documents are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, when a document is uploaded, such as through scanning or taking a picture from a camera, it is common for resulting images to contain unnecessary dots or other marks due to the malfunction of printers. In order to be isolated from the distractions of this meaningless noise, some embodiments clean the images by removing these marks. In response to the removing the background noise, some embodiments extract the characters from the document image and place the extracted characters in another format, such as JSON. Formats, such as JSON, can be used as input for other machine learning models, such as lightweight modified BERT models for language predictions, as described in more detail below.

In some embodiments, the OCR module 104 additionally (or alternatively) includes an object detection module to detect the document or objects in the document (e.g., via a machine learning model). For example, in some embodiments, in response to (or prior to) the OCR module 104 performing its functionality, text and object detection can be performed to convert 2D grayscale images to structured text associated with their bounding boxes and coordinates. For example, some embodiments use computer vision, object detection, and/or image classification techniques (e.g., Convolutional Neural Networks). In an illustrative example of object detection functionality, particular embodiments use one or more machine learning models (e.g., a Convolutional Neural Network (CNN)) to generate a bounding box that defines the boundaries and encompasses a computer object representing a feature (e.g., a total amount value, a date value, an address value, etc.) of a document or the document itself. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents or the document itself. In an illustrative example, a first bounding box can be generated over an image of a document, which triggers image capture or OCR of a document. In another example, a second bounding box can be generated over a "total amount" indicia and labeled "amount", and a third bounding box can be generated over an object (e.g., a mountain image) and labeled "mountain," as indicated in a logo, for example.

In some embodiments, a processor executing the OCR module 104 detects or extracts each word and/or number of values in a document via any suitable functionality, such as via pattern recognition and/or feature detection. With respect to pattern recognition, the OCR component 102 is fed examples of natural language text in various fonts and formats, which are then used to compare, and recognize, characters in the scanned document. With respect to feature detection, the OCR module 104 applies rules regarding the features of a specific letter or number to recognize characters in the scanned document. Features could include the number of angled lines, crossed lines, curves, or the like in a character for comparison. For example, the capital letter "A" may be stored as two diagonal lines that meet with a horizontal line across the middle. In some embodiments, the output of the OCR module 104 is each extracted field and/or value of a document and an address (e.g., X and Y coordinates) of each extracted value and/or field in the document. A "field" as described herein refers to a category, attribute, or column that is typically represented in natural language. For example, a document can include a "tail" field, which refers to an aircraft identifier. A "value" is a specific natural language indicator, number, and/or symbol that belongs to or is a constituent of a particular field. For example, a "value" of the "tail" field may be "XYT67," which represents a particular aircraft identifier. In some embodiments, the output of the OCR module 104 is each field and value for further downstream processing, as described in more detail below.

The document conversion module 106 is generally responsible for converting a document into another format in preparation for field checking via the field check module 107. In some embodiments, the document conversion module 106 first makes a programmatic call to the OCR module 104 to obtain the output of the OCR module 104 (e.g., the extracted fields and values and their coordinates/positioning information) and writes the corresponding fields and values into another format. Often, overfly invoices are difficult to analyze in certain formats and/or the original formats consume unnecessary computer memory resources. Accordingly, data may be automatically converted from one format to another in order to analyze all features of a document, save on memory resources, and the like all while maintaining high quality. For example, the document conversion module 106 can automatically convert a PDF document of several pages into a comma-delimited file of type .csv. However, the output can be any suitable file output format (e.g., .JSON, .jpg, .png, .bmp, .tiff, etc.). Examples of conversion includes a PDF-to-JSON or PDF-to-JPEG converter. JPEG, for example, is a file format that can contain image with 4:1 to 10:1 lossy image compression technique via conversion. With this compression technique embodiments can reduce the image size of images contained within PDF documents without losing the image quality.

It is understood that in various embodiments, there is no document conversion module 106. Rather, in some embodiments, the user is required, for example, to populate an HTML, CSV, or other web-based formatted document without automated conversion or other pre-processing of the document. In these embodiments, the document validator 102 may only contain the field check module 107 (and not the document conversion module 106 nor the OCR module 104).

In some embodiments, the document conversion module 106 additionally or alternatively performs functionality by using an Extract Transform Load (ETL) functionality. ETL refers to the concept of pulling (or copying) data from one or more source databases (e.g., the results from the OCR module 104 stored to the data store 105) and writing the pulled data into a target data store (e.g., a data warehouse) with another format. Specifically, for the "Extract" operation, data (e.g., raw data) is extracted or read from one or more data sources. For the "Transform" operation, the read data is converted from its previous form (e.g., raw form) into the form it needs to be in so that it can be placed in another database. Transform occurs by using lookup tables, one or more rules, or combining the read data with other data. In an illustrative example of the Transform operation, the Transform operation can additionally clean, sort, validate, and/or prepare the read data. For the "Load" operation, the transformed data from the "Transform" operation is then written into a target data store.

Alternatively or additionally, in some embodiments, the document conversion module 106 performs functionality by performing machine learning pre-processing steps on one or more documents, such as data wrangling, data munging, scaling, and the like. Data wrangling and data munging refers to the process of transforming and mapping data from one form (e.g., "raw") into another format to make it more appropriate and useable for downstream processes (e.g., predictions). Scaling (or "feature scaling") is the process of changing number values (e.g., via normalization or standardization) so that a model can better process information. For example, the document conversion module 106 can bind number values between 0 and 1 via normalization. In some embodiments, the output of the document conversion module 106 is an image of a document with a fixed crop ration, pixel per inch (PPi).

The field check module 107 is generally responsible for determining whether the fields of the document received or processed by the document validator 102 meet particular validation criteria. For example, the field check module 107 checks to see whether the pre-processed document (e.g., by the OCR module 104 and/or the document conversion module 106) includes one or more predefined fields and/or whether the corresponding values meet predefined formatting requirements—the validation criteria. For example, a conditional programming rule may be to validate (or allow further processing) of an invoice only if the field check module 107 reads a "UTC DATE" column, a "FLIGHT" column, a "TAIL" column, and "ORIGIN" column, a "DESTINATION" column, a "CHARGE TYPE" column," and/or a "SERVICE CHARGE (LOCAL)" column in the pre-processed document.

The "UTC DATE" field refers a date that the document was generated on or any other suitable date. In some embodiments, in order to be validated by the field check module 107, the date (the actual values) must meet particular date formatting requirements, such as a DD/MM/YY. The "FLIGHT" field refers to a particular flight ID or code. In some embodiments, to be validated, the flight ID values must start with a particular carrier code followed by 1-4 digits or any quantity of digits (e.g., UPS0064 or UPS64). The "TAIL" field refers to an aircraft ID or code to identify an aircraft. In some embodiments, to be validated, the TAIL ID value must be formatted in a particular way (e.g., N ## #UP, ## #, or OYSXX for Lease Carrier flights).

The "ORIGIN" field refers to the origin or departure point (e.g., a gateway code or geo-coordinates) of an aircraft. In some embodiments, in order to be validated, the gateway code values must contain a specific character quantity (e.g., IATA (3-character) or ICAO (4-character). The "DESTINATION" field refers to the destination or arrival point (e.g., another gateway code or geo-coordinates). In some embodiments, these gateway codes must also contain a specific quantity of characters (e.g., IATA (3-character) or ICAO (4-character)). The "CHARGE TYPE" field refers to a particular category or type of charge (e.g., cost). For example, the category might be a landing charge, an overfly charge, or total charge (the summation of landing and overfly charges). In some embodiments, to be validated, the CHARGE TYPE must be a particular quantity of characters, such as a single character (e.g., E, C, M, T, or V), which correspond to particular charge types (e.g., ERC, COM, MET, TNC, and VSAT).

The "SERVICE CHARGE (LOCAL)" field or any "service charge" described herein refers to a particular charge to pay for individual services related to flying through a country's airspace or landing at a particular country. This specific "LOCAL" field indicates that the service charge is to be indicated in the local currency of the auditing entity. There may be many individual line item or service charges related to overly or landing charges. For example, there may be charges for a particular time spent in the airspace, charges for the type of aircraft used (e.g., directly proportional greenhouse gas emissions), air traffic controller charges for the use of local air traffic controller personnel, charges for the amount of time an aircraft is grounded in a country, charges for the time of day the flight takes place, and the like. Each of these are referred to as individual service charges. In some embodiments, to be validated, the service charges must be a valid integer or decimal number with no commas.

In some embodiments, the field check module 107 uses syntactic matching analysis to determine if there is an exact match between field names indicated in the document and other predefined fields. For example, in some embodiments, the field check module 107 uses term frequency-inverse document frequency (TF-IDF) algorithms. TF-IDF algorithms include numerical statistics that infer how important a query word or term is to a data set (e.g., a document). "Term frequency" illustrates how frequently a term of a query (e.g., "TAIL") occurs within a data set (e.g., an invoice), which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. In these embodiments, for example, where a predefined field is "amount," these algorithms can use term frequency to find the exact string match (i.e., "amount") and remove all other words in the document via inverse document frequency.

In another example, the field check module alternatively or additionally uses natural language processing (NLP) in order to find semantically similar words relative predefined fields. For instance, in some embodiments, the field check module 107 first tokenizes text in a document into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a document is tagged with identifiers, such POS identifiers.

In some embodiments, NLP derives semantic and syntactic content of semi-structured or unstructured data (e.g., data in image files). This is in contrast to analyzing "structured" data, such as data in a database. NLP can be configured to parse content to determine semantic context (e.g., the meaning of words by analyzing each word in a document against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, NLP includes Named Entity Recognition (NER). NER is an information extraction technique that identifies and classifies elements or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location, time, price (or other invoice data) and the like. In this context of the present disclosure, for example, these tags or labels can indicate whether certain extracted attributes correspond to "total amount" of an item, the name of an entity (e.g., a particular corporation), line item information (e.g., description of service or item billed), address of an entity, or the particular date listed on the page, or any of the fields listed above-UTC DATE, FLIGHT, TAIL, ORIGIN, DESTINATION, CHARGE TYPE, or SERVICE CHARGE.

Some embodiments use NLP models (e.g., WORD2VEC or BERT) to map different words to the same/similar semantic vector space to detect whether a certain field is present in a document or not. For example, a field named "TAIL" and "AIRCRAFT ID" can be mapped to the same or nearly identical vector space. In this way, for example, for a predefined field of "TAIL," the semantically similar field of "AIRCRAFT ID" can be validated as corresponding to the "TAIL" field based on corresponding vectors being within a particular distance (e.g., Euclidian or Cosine) threshold.

In these embodiments, a model can first convert a document into a set of vectors. A "vector" as described herein refers to a machine-readable code of numbers that represents one or features of a document (e.g., word, location of word, field, value, image, etc.). Each vector can be concatenated (e.g., via a dot product) to represent an entire document so that each feature of the document is captured. These vectors can then be fed into a model, such as input layers, hidden layers, and output layers of a neural network to compute a distance between the set of vectors and other vectors representing documents the model trained on.

As described above, embodiments of some models fine-tune or train on particular overfly audit documents to learn weights in order to extract useful information from particular attributes, unlike existing technologies. For example, in some embodiments, a neural network (e.g., a modified BERT encoder or model) is trained on multiple labeled overfly auditing invoices in order to make acceptable loss training predictions by learning the semantic meaning of different invoice fields, which will help later at deployment time to make correct inference predictions.

In one or more embodiments, learning or training can include minimizing a loss function between the target variable/ground truth (e.g., the particular semantic meaning of a field) and the actual predicted variable (e.g., an incorrect meaning). Based on the loss determined by a loss function (for example, Mean Squared Error Loss (MSEL), cross-entropy loss, etc.), the loss function learns to reduce the error in prediction over multiple epochs or training sessions so that the neural network learns which features and weights are indicative of the correct inferences, given the inputs. Accordingly, it may be desirable to arrive as close to 100% confidence in a particular classification or inference as possible so as to reduce the prediction error. In an illustrative example, the neural network can learn over several epochs that for a given field (e.g., TAIL), the likely or predicted correct or top candidate is aircraft identifier based on the fields being labeled as "AIRCRAFT ID" and learning weights of the TAIL field.

Subsequent to a first round/epoch of training, the neural network may make predictions, which may or may not be at acceptable loss function levels. This process may then be repeated over multiple iterations or epochs until the optimal or correct predicted value(s) is learned (for example, by maximizing rewards and minimizing losses) and/or the loss function reduces the error in prediction to acceptable levels of confidence.

In some embodiments, the neural network learns, via training, parameters, or weights so that similar features are closer (for example, via Euclidian or Cosine distance) to each other in feature space by minimizing a loss via a loss function (for example, Triplet loss or GE2E loss). For example, "TAIL" fields may be mapped near each other, in vector space, to "AIRCRAFT ID" fields, since they have a semantically similar meaning. Over various training stages or epochs, certain feature characteristics for each target prediction can be learned or weighted. Consequently, this pattern can be weighted (for example, a node connection is strengthened to a value close to 1, whereas other node connections (for example, representing other documents) are weakened to a value closer to 0). In this way, embodiments learn weights corresponding to different features such that similar features found in inputs contribute positively for predictions.

In one or more embodiments, the neural network learns features from the training data inputs and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. For example, at a first layer of the neural network, nodes representing a first field (e.g., "TAIL") is weighted higher than nodes representing a second field (e.g., "COUNTRY" ID), since the first set of phrases may be more indicative of an "aircraft ID" classification.

In some embodiments, if particular values of fields of a document do not meet particular validation criteria based on format (e.g., a MM/DD/YY format), particular embodiments automatically format the particular values for validation. In these embodiments, NLP-based models (e.g., BERT) or heuristic-based rules can be used to identify values that are supposed to belong to certain fields even though they are not formatted correctly. For example, a programming conditional rule might state that if two or four individual consecutive numbers exist at all in a character sequence, it corresponds to a date. But the date may read MM.DD.YY, which uses periods instead of forward slashes (/). However, dates may only be validated if they contain slashes. Accordingly, particular embodiments may automatically reformat the date by changing the periods to forward slashes. In other embodiments, a prompt or notification is alternatively (or additionally) provided to a user indicating that some field does not exist, and the user must change the date to include forward slashes.

The flight planning system (FPS) component 108 is generally responsible for deriving data associated with expected charges (e.g., expected overfly and landing charges) for an aircraft to fly over (and/land in) a particular country. In some embodiments, the FPS component 108 derives this data by making a programmatic API call, over the computer network(s) 110 (e.g., via sending a TSP/IP packet), to a service (e.g., a server) that calculates expected charges or accesses associated historical flight data, which can then be returned, via the API and the network(s) 110, to the FPS component 108 or to the storage 105.

In some embodiments, the service calculates an "expected charge" based on actual charges paid (e.g., by a logistics entity) to fly over (and/or land in) a particular country. For example, for every aircraft that flied over country X's airspace, a particular entity may have actually paid a particular quantity of money, and each paid quantity for each entity can then be averaged or otherwise aggregated to calculate an expected charge, which can then be returned to the FPS component 108. In this way, and as described in more detail below with respect to the document exception analyzer 112, for a particular current invoice document with an identifier that matches at least country X, the expected charges can be compared against the invoice to detect discrepancies. Moreover, other metadata provided by these services can be passed to the planned charge lookup component 120, as described in more detail below. In some embodiments, such metadata includes historical flight data, such as origin and destination information, date of flights, miles flown, airspace, flight numbers, or the like, which is described in more detail below.

The document exception analyzer 112 is generally responsible for analyzing particular uploaded documents (e.g., invoices) for discrepancies or exceptions relative to expected charges for the same country as derived by the FPS component 108. The document exception analyzer 112 includes the filtering module 114, the analyzer 116 (which includes the invoice charge module 116-1, the FPS charge module 116-2, and the exception module 116-3), and the audit results tracking component 118.

The filtering module 114 is generally responsible for filtering results generated by the analyzer 116 based on a selection of one or more parameters. For example, after an invoice is successfully validated by the document validator 102, a user may select the parameters for the document exception analyzer 112 (or more specifically, the analyzer 116) to perform its analysis on. For instance, a user can filter results by start date/end date, country, airspace, charge type, cost variance limit, start/end entry date/time, as described in more detail below.

The Analyzer 116 is generally responsible for comparing a first set of values indicated in the document (e.g., each line item charge or a total charge in the document) against a second set values (e.g., expected line item/total charges or other historical flight information, such as actual costs paid of past flights) that fall within the filtering parameters specified by the filtering module 114, and then determining whether the first set of values exceed one or more thresholds, and then causing a corresponding indication at a user interface. For example, based on a user selecting a particular country indicator (country X) with a specific charge type Y (as set by the filtering module 114), the analyzer 116 makes a programming call to the FPS component 108, which then makes a call (as described above) to the service to return all data where flights were made to country X under charge type Y. The analyzer 116 can then compare the expected costs for country X under charge type Y (as derived by the FPS component 108) with the invoice charges (since such charges were parsed and converted into machine-readable code by the document validator 102) to determine whether such invoice charges exceed the expected charges.

In response to the analyzer 116 performing its functionality, it causes presentation of a summary of the analysis, and invoice charges are displayed in the results table alongside their corresponding FPS charges and flagged exception (if applicable). In other words, the analyzer 116 provides a summary at a glance of a number of charges and cost comparisons found in the document and the queried FPS charges (those derived by the FPS component 108). In some embodiments, such summary includes charges computed by the invoice charge module 116-1, the FPS charge module 116-2, and the exception module 116-3. The invoice charge module 116-1 is generally responsible for computing or causing presentation of all document-related charges, such as "TOTAL INVOICE CHARGES," "TOTAL INVOICE LOCAL COST," and "TOTAL INVOICE COST VARIANCE," as described in more detail below.

The FPS charge module 116-2 is generally responsible for computing or causing presentation of all FPS-related charges derived by the FPS component 108. For example, the FPS charge module 116 can cause presentation of "TOTAL FPS CHARGES," "TOTAL FPS LOCAL COST," and "TOTAL FPS USD COST," as described in more detail below.

The exception module 116-3 is generally responsible for computing or flagging particular exceptions or discrepancies between the first set of values and the second set of values when one or more thresholds have been exceeded. For example, a "COST," exception can be flagged in response to or based on comparing invoice charges to expected charges, where the invoice charge has a cost variance greater than a specified acceptable threshold compared to the expected charges derived by the FPS component 108. In an illustrative example, in some embodiments, the exception module 116-3 computes exception values for the following field-"DUPLICATE," "REINVOICE," "COST," "MONTH," "FLIGHT," "TAIL," "LEASE CARRIER," and "MISSING," as described in more detail below.

The audit results tracking component 118 is generally responsible for storing, in computer storage 105, results produced by the document exception analyzer 112 and/or computer user input comments in response to particular criteria/conditions being met. After the exception module 116-3 performs its analysis, invoices and the audit results can be saved for later viewing by users. After saving, the invoice audit can be viewed and updated (e.g., for up to 90 days) after the initial save. Along with saving the analysis results, users can save comments (e.g., up to 200 characters). However, one condition may be that an exception cannot be marked as closed as stored to the storage 105 unless and until the user inputs comments, which is described in more detail below.

The planned charge lookup component 120 is generally responsible for looking up and rendering one or more FPS charges or other historical flight information derived by the FPS component 108. Such data aids users in manually validating and resolving the exceptions computed by the exception module 116-3 because it offers a more detailed view of the FPS data. For example, in response to the exception module 116-3 computing the exceptions and in response to a user selection of a button to initiate the functionality of the planned charge lookup component 120, the planned charge lookup component 120 makes a programmatic call to the FPS component 108 (which has already derived the FPS data needed for the document exception analyzer 112) to return relevant data, such as data filtered by the filtering module 122.

The planned charged lookup component 120 includes the filtering module 122, the charge summary module, and the charge results attributes. The filtering module 122 is generally responsible for filtering results produced by the charge summary module 124 and charge result attributes 126, according to user selections of corresponding parameters. For example, such filtering can be done based off parameters such as, "Ops Start/End Date," "Search Type," "Country or "provider," "Airspace," "Charge Type," "Flight #," "Origin," "Sch Dest," "Sart/End Entry Date/Time," which is described in more detail below.

The charge summary module 124 is generally responsible for computing and consolidating/concatenating specific historical expected charge data into a summary according to parameters selected via the filtering module 122 and causing presentation thereof. For example, the charge summary module 124 can compute a "Charge count," a "Flight Count," a "Total Cost (USD)," or "Total Cost (Local)," as described in more detail below.

The charge results attributes module 126 is generally responsible for consolidating/concatenating a table of all historical flight data associated with the expected charges. For example, such historical flight data can include the following attributes-"Country," "Provider," "Airspace," "Type," "Entry Tm (Z)," etc., which are all described, among other attributes, in more detail below.

Figure 4A:
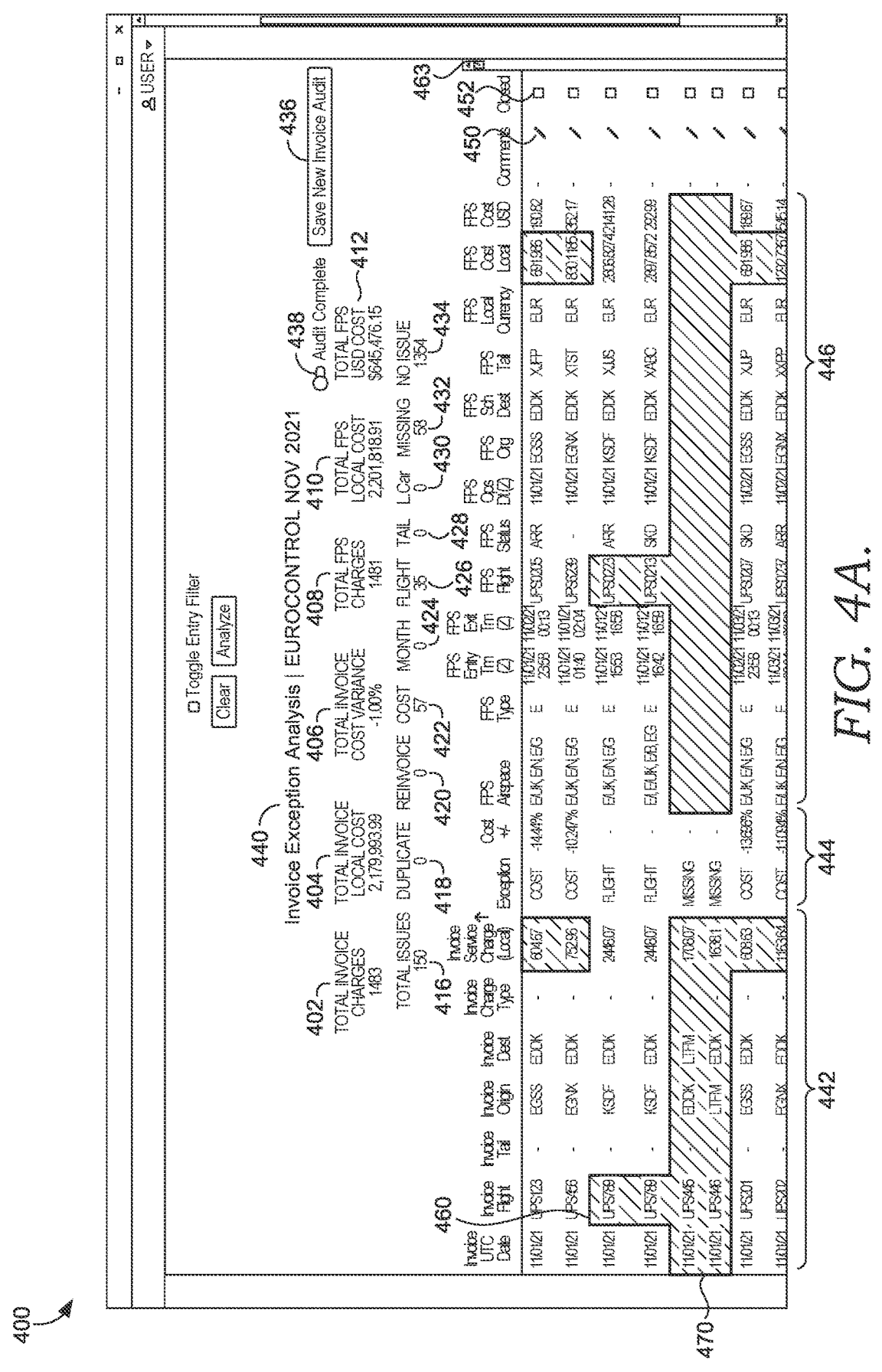

The export component 128 is generally responsible for exporting results produced by the document exception analyzer 112 and/or the planned charge lookup component 120 into a different file or format. In some embodiments, this includes extracting all the fields and values (e.g., as indicated in FIG. 4A) located in a data structure or file (e.g., an HTML or other web-based file) representing the data in a user interface (e.g., FIG. 4A) and then writing such fields and values to a different format (e.g., a PDF or EXCEL file). In some embodiments, in order to perform such functionality, the OCR module 104 or other module first detects all the fields, values, and coordinates in the original file and then passes such data to the export component 128 so that the export component 128 can place the fields and values in their appropriate location (based on the coordinates determined by the OCR module 104) in another format. In some embodiments, such functionality equates to converting a first file in a first format to another file in a different format. In alternative embodiments, such data can be scraped (via web scraping) from the user interface itself and then exported to a particular file. In some embodiments, such exportation functionality is performed based on user requests, which is described in more detail below.

The presentation component 130 is responsible for generating—or causing generation of—user interface features. Such features can include interface elements (e.g., fields, values, superimposed highlighting over such fields/values, graphics buttons, sliders, menus, audio prompts, alerts, alarms, vibrations, pop-up windows, notification-bar or status-bar items, in-app notifications, or other similar features for interfacing with a user), queries, and prompts.

III. Example User Interfaces

Figure 2A:
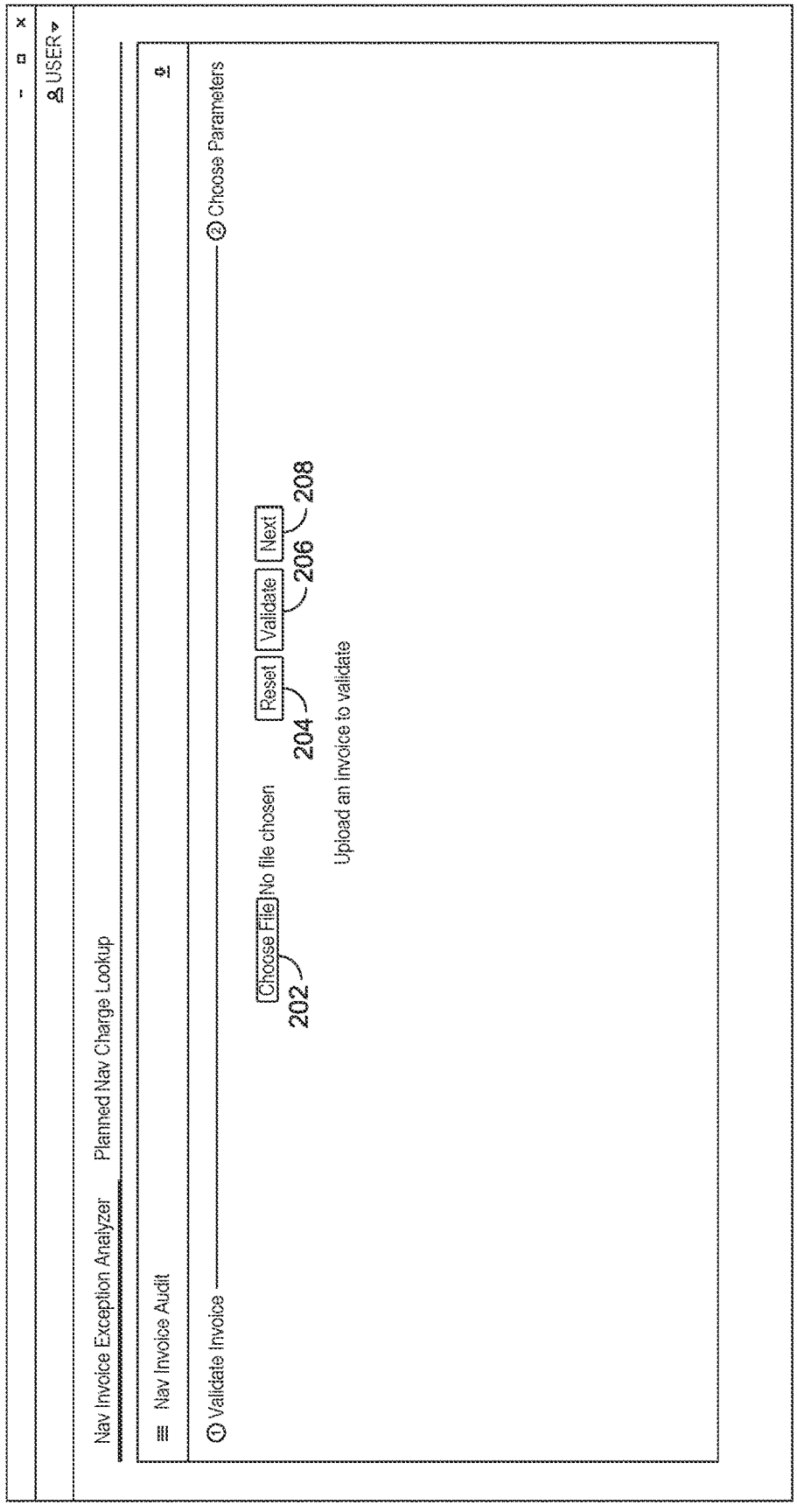
FIG. 2A is a screenshot of an example user interface for choosing a file for document validation, according to some embodiments.

FIG. 2A is a screenshot 200 of an example user interface for choosing a file for document validation, according to some embodiments. In some embodiments, functionality indicated in FIG. 2A includes functionality performed by the document validator 102 of FIG. 1. In response to receiving an indication that a user has selected the "choose file" button 202, particular embodiments communicate with an operating system shell, which causes corresponding dialogue boxes or flyout windows to be produced at a user device so that a user can upload (e.g., copy the file from local user storage to server storage) a desired document or file. In response to receiving an indication that the user has selected the "reset" button 204, particular embodiments remove the uploaded file from storage.

Figure 2B:
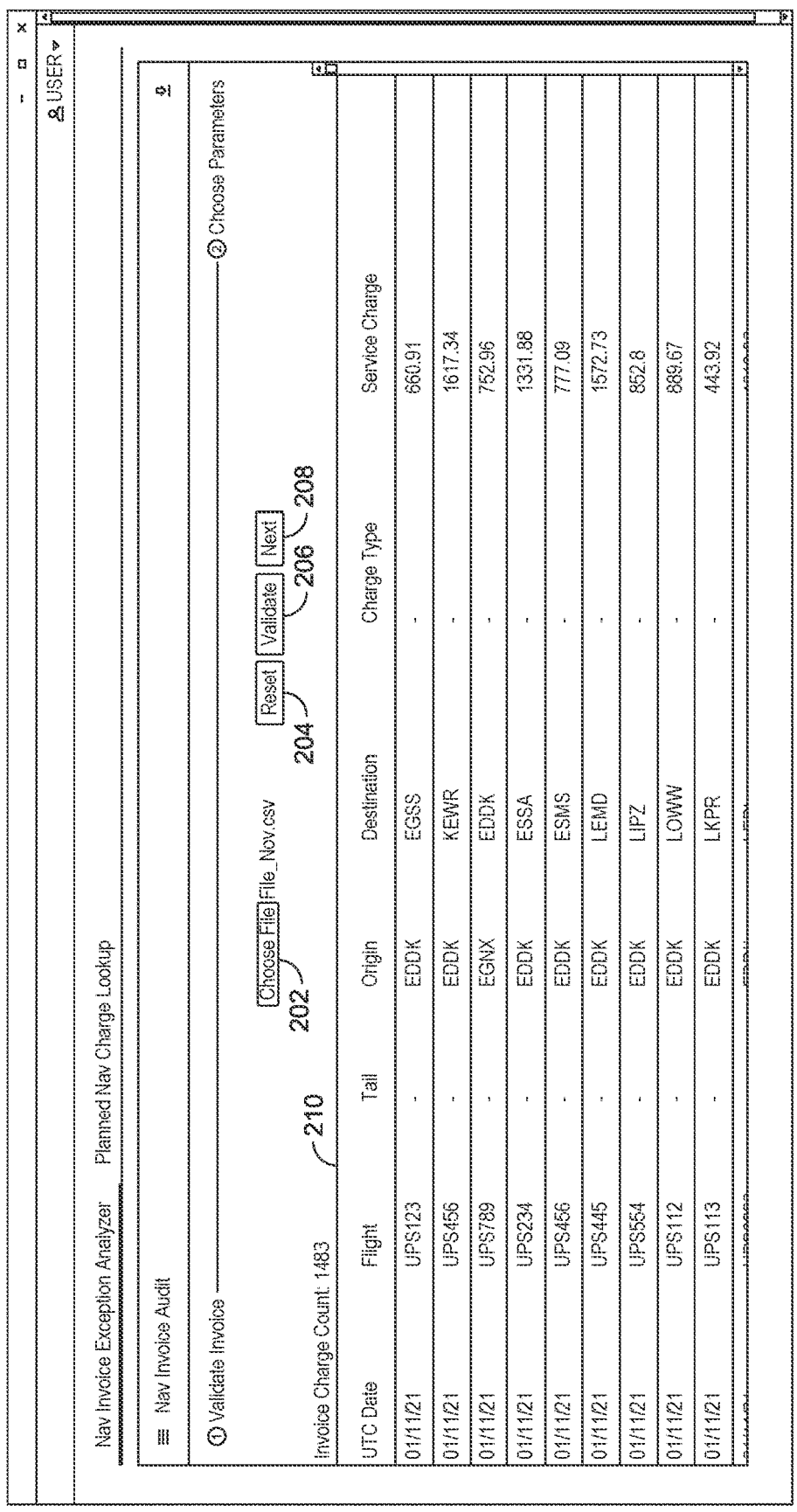
FIG. 2B is a screenshot of an example user interface for validating a document via selection of the "validate" button of FIG. 2A, according to some embodiments.

FIG. 2B is a screenshot 200-1 of an example user interface for validating a document via selection of the "validate" button 206 of FIG. 2A, according to some embodiments. In some embodiments, the functionality indicated in FIG. 2B includes functionality performed by the document validator 102 of FIG. 1. For an invoice to be uploaded an analyzed, in some embodiments, it must meet certain formatting requirements. Any formatting issues may be displayed for correction to the user. In response to receiving an indication that the user has selected the "validate" button 206, particular embodiments validate the document, as described with respect to the document validator 102 of FIG. 1.

In response to validating the document, particular embodiments cause presentation of the document 210 (e.g., which represents the document, except in an acceptable converted format). In some embodiments, if the document is not validated particular embodiments superimpose visual data (e.g., highlight) over one or more fields or values in the document that indicates why the document 210 was not validated and/or otherwise provides a notification that a document was not validated for a particular reason (e.g., without presenting the document 210). For example, some embodiments, may highlight the "origin" field and all values and then provide a notification indicating that it was in the incorrect format, along with a natural language explanation for why it is in the incorrect format. Alternatively, in some embodiments, if the document is validated, particular embodiments cause presentation of the document 210 with no visible superimposed indicia indicating invalidation, as well as the line item voice count—i.e., the "invoice charge count 1433" indicia.

In response to receiving an indication that the user has selected the "next" button 208, particular embodiments automatically switch pages so that the document exception analyzer 112 and/or the planned charged lookup component 120 can perform its functionality, as described in more detail below.

FIG. 3A is a screenshot 300 of an example user interface illustrating particular parameters that a user can select for filtering results performed by the document exception analyzer 112 of FIG. 1, according to some embodiments. In some embodiments, the functionality indicated in FIG. 3A is performed by the filtering module 114 of FIG. 1. In some embodiments, in response to receiving an indication that the user has selected the "next" button 208 of FIG. 2, particular embodiments cause presentation of the screenshot 300.

The screenshot 300 includes the start date field 302, the end date field 304, the country field 306, the airspace field 308, the charge type field 309, and the cost variance limit field 310. Particular embodiments are configured to either receive free-form natural language text in these fields or each of these fields can contain other user interface elements, such as a drop-down arrow, such that the user can select corresponding parameters.

The "start date" field 302 or user interface element represents a beginning flight date to search for regarding FPS flights (as derived by the FPS component 108) to include in the analysis. Likewise, the "end date" field 304 or user interface element represent an ending flight date to search for regarding FPS flights to include in the analysis. In other words both start date 302 and end date fields 304 represent a date range of historical flight data to search for. For example, in response to receiving a user selection of a range between the years 2020 and 2022, the filtering module 114 can make a programmatic call to the FPS component 108 to only return data within those years (e.g., expected costs for all flights to country X between the years 2020 and 2022). In some embodiments, the start date field 302 and the end date field 304 defaults to the earliest and/or latest dates indicated in the invoice 210. In some embodiments, the start date field 302 and the end date field 304 correspond to a range of dates where one or more aircraft first entered into (or landed) in a particular country (start date) all the way through when those same one or more aircraft exited out of the air space (or departed out of) the same particular country.

The "country" field 306 or user interface element indicates a country identifier for which an overfly/landing charge will be calculated for in the document 210 and for which the FPS data will be retrieved. In other words, it is the country for which the invoice and corresponding historical FPS data covers. For example, in response to receiving an indication that the user has selected a "United States" parameter in the "country" field 306, the filtering module 114 makes a programmatic call to the FPS component 108 so that the component 108 can retrieve an return expected cost and other historical data for the country specified (and no other country).

The "airspace" field 308 and user interface element indicates a particular airspace identifier for which the invoice and corresponding historical FPS data covers. Airspace indicators (e.g., EUROCONTROL) may identify a particular X, Y, and Z volume of space above a particular country. Each country may include one or more airspaces identified by particular identifiers. Some auditing systems identify airspaces alternative to countries. In response to receiving an indication that the user has selected a particular airspace identifier (e.g., XPD), the filtering module 114 calls the FPS component 108 to retrieve historical flight data, such as expected charges, only for corresponding airspace of a particular country. In some embodiments, when the user selects a EUROCONTROL airspace identifier, some embodiments automatically translate or sum up the flight charges of all European countries that have accrued charges. For example, some embodiments add up the overfly charges of all 44 countries for all flights in Europe as long as there are overfly charges for all 44 countries.

The "charge type" field 309 and user interface element indicates a filter for charge types to search for in the database of expected charges. In other words, it indicates a particular identifier for which the invoice and corresponding historical FPS data covers. For example, in response to receiving an indication that the user has selected a particular charge type, the filtering module 114 calls the FPS component 108 to retrieve historical flight data, such as expected charges only under a specific category (e.g., "All," "E-ERC," "C-COM," "M-MET," T-TNC," or "V-VSAT").

The "cost variance limit" field 310 or user interface element indicates an acceptable cost variance (or threshold) between one or more invoice charges and one or more corresponding expected charges. If such variance or difference is beyond or exceeds such threshold, a "COST" exception is flagged, as described with respect to the exception module 116-3. For example, in response to receiving an indication that a user has selected a "5%" value under the "cost variance limit" field 310, particular embodiments search for a "COST" exception where the total invoice overfly charge has a 5% or more difference relative to the expected total invoice overfly charge, as derived by the FPS component 108. In some embodiments, the default cost variance limit field 310 is defaulted to 10%. In some embodiments, such cost variance limit can be any value alternative to percentages, such as actual integer value differences in a particular country's currency. For example, a cost variance limit may be "$2,000" which indicates that as long as the difference between the overfly/landing charges indicated in the document 210 and the expected corresponding charges is less than or equal to $2,000, then no flagged exception will be made.

In response to receiving an indication that the user has selected the "USD invoice mode" field 312, particular embodiments convert the currency format that the invoice 210 is in to a U.S. currency. For example, a particular value in pounds can be converted to dollars.

FIG. 3B is a screenshot 300-1 of an example user interface that is presented in response to receiving an indication that the user has selected the "toggle entry filter" button 314 of FIG. 3A, according to some embodiments. In some embodiments, in response to receiving such indication, the "start entry date" field 316, the "start entry time" field 318, the "end entry date" field, and the "end entry time" fields are caused to be presented at the screenshot 300-1. The "start entry date" field 316, the "start entry time" field 318, the "end entry date" field 320, and the "end entry time" fields 322 are similar to the "start date" field 302 and the "end date" field 303 of FIG. 3A, except that the user can specify, with more granularity, to search for actual clock times that aircrafts began flying over a particular country's airspace (or landed in a particular country) and the actual clock time the those same aircrafts exited out of the particular country's airspace (or lifted off from/departed from the country). This is useful for when most of the desired flight time data falls between two dates, such as late night and into the early morning hours (e.g., between 10 p.m. on Monday and 5 a.m. on the next Tuesday). In these situations, filtering historical flight data by mere dates may not be as helpful as specific entry and exit times.

In response to receiving an indication that the user has selected the "match invoice dates to FPS entry dates" field 324, particular embodiments toggle to adjust analysis for invoices that use entry dates rather than flight dates. "Entry dates" are dates that an aircraft actually flew over or landed in a particular country, as opposed to a "flight date," which may indicate the date at which an aircraft departed and/or the date the aircraft was scheduled to fly over or land in the particular country.

In response to receiving an indication that the user has selected the "clear" button 326, particular embodiments delete data from the fields 316, 318, 320, 322, and 324. In response to receiving an indication that the user has selected the "analyze" button 328, the filtering module 114 makes a programmatic call to the analyzer 116, so that this module can perform its analysis with the corresponding filters selected, as described with respect to FIG. 1.

FIG. 4A is a screenshot 400 of an example single page of a user interface that presents an example analysis provided by the document exception analyzer 112 of FIG. 1, according to some embodiments. Accordingly, in some embodiments, the functionality indicated in FIG. 4A is performed by one or more components of the document exception analyzer 112 of FIG. 1. In some embodiments, in response to receiving an indication that the user has selected the "analyze" button 328, particular embodiments cause presentation of the screenshot 400.

The screenshot 400 of FIG. 4A includes an invoice analysis summary, which includes specific fields and values—the TOTAL INVOICE CHARGES 402, the TOTAL INVOICE LOCAL COST 404, the TOTAL INVOICE COST VARIANCE 406, the TOTAL FPS CHARGES 408, the TOTAL FPS LOCAL COST 410, and the TOTAL FPS USD COST 438. The indicia 440 refers to an analysis title with the country and month specified based on the search criteria/parameters selected by the user or filtered via the filtering module 114. This summary indicates a quantity of charges and cost comparison found in the invoice 210 and the queried expected charges (derived from the FPS component 108).

The TOTAL INVOICE CHARGES field 402 refers to a total quantity of charges in an uploaded invoice—i.e., the invoice 210. This may refers to a particular quantity of line items. For example, there may be a first overfly charge on a first line and a second landing charge on a second line. Thus, in this example the total quantity of charges would be 2. The field 402 indicates that there are a total number of 52 charges or line items.

The TOTAL INVOICE LOCAL COST field 404 refers to the total cost of invoice charges indicated in the invoice 210 in the local currency and in the audit country specified. In some embodiments, populating this field requires converting the original currency values indicated in the invoice 210 to currency corresponding to the audit country, as described herein.

The TOTAL INVOICE COST VARIANCE field 406 indicates the cost variance (e.g., percentage difference) between the total invoice local cost (i.e., the value in the field 404) and the total FPS local cost of charges (i.e., value in the field 410) found via the analysis search criteria specified via the filtering module 114.

The TOTAL FPS CHARGES field 408 indicates a total quantity of expected FPS charges in light of the analysis search criteria specified via the filtering module 114. For example, this field can refer the total quantity of specify types of charges (e.g., overfly and landing) for different aircraft to fly over (or land in) a particular country. The field 408, for example, indicates that there are a total of 54 FPS charges.

The TOTAL FPS LOCAL COST field 410 indicates the total cost of expected FPS charges in the local currency of the audit country specified and via the analysis search criteria of the filtering module 114. For example, for a particular flight and aircraft, particular embodiments can sum up the overflight charges and the landing charges to populate the field 410. Such step can be repeated for other flights and aircraft that fly over (or land in) the same country. In this way, some embodiments average out or otherwise consolidate different total FPS local costs of different flights/aircraft into the field 410.

The TOTAL FPS USD COST field 412 indicates the total cost of expected FPS charges in US dollars found by the analysis search criteria specified via the filtering module 114. In other words, the field 412 is identical in functionality to the TOTAL FPS LOCAL COST field 410, except that certain embodiments convert the total cost output to a USD cost, where the original total cost output is not already in USD.

Continuing with FIG. 4A, the fields and values 416, 418, 420, 422, 424, 426, 428, 430, 432, and 434 all represent computations performed by the exception module 116-3. Accordingly, these fields represent different exceptions when comparing charges of the invoice 210 against associated expected charges. The "TOAL ISSUES" field 416 indicates the total quantity of exceptions or discrepancies located. The "DUPLICATE" field 418 indicates identical invoice charges appearing more than once on the same invoice, such as the invoice 210. Such computations can be performed via syntax matching (e.g., via TFIDF) of numbers or fields, or semantic analysis.

The REINVOICE field 420 indicates an invoice charge identical to a charge on a previously saved invoice. For example, the invoice 210 may have an overfly charge of X dollars. Another invoice previously analyzed by the document exception analyzer 112 and stored to the storage 105 may have an identical overfly charge of X dollars (e.g., for flying over/landing in the same country).

The COST field 422 identifies a particular invoice charge-located in the invoice 210—with a cost variance greater than a specified acceptable threshold compared to the expected FPS cost. In some embodiments, the COST field 422 additionally or alternatively indicates a particular count or quantity of charges in the invoice 210 that have a cost variance greater than the specified acceptable threshold.

The MONTH field 424 indicates/identifies an invoice charge in the invoice 210 with a month falling outside the range of the current audit month (e.g., a single invoice charge for October 1 appearing on a September-based audit). The FLIGHT field 426 indicates a count or identity of an invoice charge in the invoice 210 that matches an expected FPS charge on all fields, except for a flight number. The "TAIL" field 428 indicates a count or identity of an invoice charge in the invoice 210 that matches an expected FPS charge on all fields, except for the tail number.

The LEASE CARRIER field 430 indicates an identity of or count of an invoice charge in the document 210 identified as a LEASE CARRIER flight and requires manual auditing (e.g., UPS flight planning system do not build flight plans for LEASE CARRIER flights). A lease carrier is a third party carrier or logistics entity that performs logistics operations, such as flights, for another primary logistics entity that pays the third party for performing the logistics operations. Accordingly, the LEASE CARRIER field 430 may indicate which charges were made using a lease carrier.

The MISSING field 432 indicates a count or identification of an invoice charge in the invoice 210 that could not be matched to any corresponding expected FPS charges. For example, for an invoice that indicates country X, there may not have been any historical flights to country X and thus no expected charges. The "NO ISSUE" field 434 indicates a count or a quantity or identity of charges where there were no exceptions found.

Continuing with FIG. 4A, the attributes 442 indicate different charge attributes and corresponding values extracted from the invoice 210. The attributes 444 indicate particular fields for exception and cost variance (if applicable). For example, the "EXCEPTION" field in 444 indicates the identifier that identifies the type of exception found for the corresponding record, line item, or charge in the invoice 210. For instance, for the second record of a service charge of $1677.56, a "MISSING" exception was located, which is indicated as "MISSING" and incremented to the count in the field 432.

The attributes 446 indicate fields for corresponding expected charge FPS data, which is described in more detail below. In some embodiments, each field and values 446 populated to the screenshot 400 is derived from the FPS component 108, which derives such data from a remote service, as described herein.

The highlight data 460 represents visual data that is superimposed over corresponding values, columns, and/or records such that the values, columns, and records are still displayed and viewable, as illustrated in FIG. 4A. Such highlight data 460 can represent unique pixel colors (e.g., yellow), highlights, or other Virtual Reality (VR) overlays. In some embodiments, the highlight data 460 is superimposed over particular values based on a corresponding exception found, as indicated in 416, 418, 420, 422, 424, 426, 428, 430, 432, or 434. For example, for record 470— i.e., the charge 2208.22—the screenshot 400 indicates that there has been a "MISSING" exception found. Therefore, in response to making such determination of this exception being found for the particular charge, particular embodiments cause presentation of the highlight data 460 over the record 470, as illustrated in FIG. 4A.

In some embodiments, in response to receiving an indication that the field 312 has been selected, particular embodiments change corresponding values in the screenshot 400. For example, the TOTAL INVOICE LOCAL COST may change to USD, which changes what values are compared by the analyzer 116, as described herein.

In response to receiving an indication that the user has selected the "Save New Invoice Audit" button 436, some embodiments store, in computer storage 105, the data indicated in the screenshot 400 so that the user can look at the data at a later time. Some embodiments filter particular records that have no issues or exceptions (e.g., as indicated in the field 434) to the bottom of the results. For example, although not explicitly indicated in FIG. 4A, if the user scrolls down, via the scroll bar 463, the user would see various records/charges for the same columns where no exceptions were found. In response to determining that a particular record/charge has no exception, some embodiments automatically populate the "closed" field 452 for that corresponding record since there is no exception to analyze.

Figure 4B:
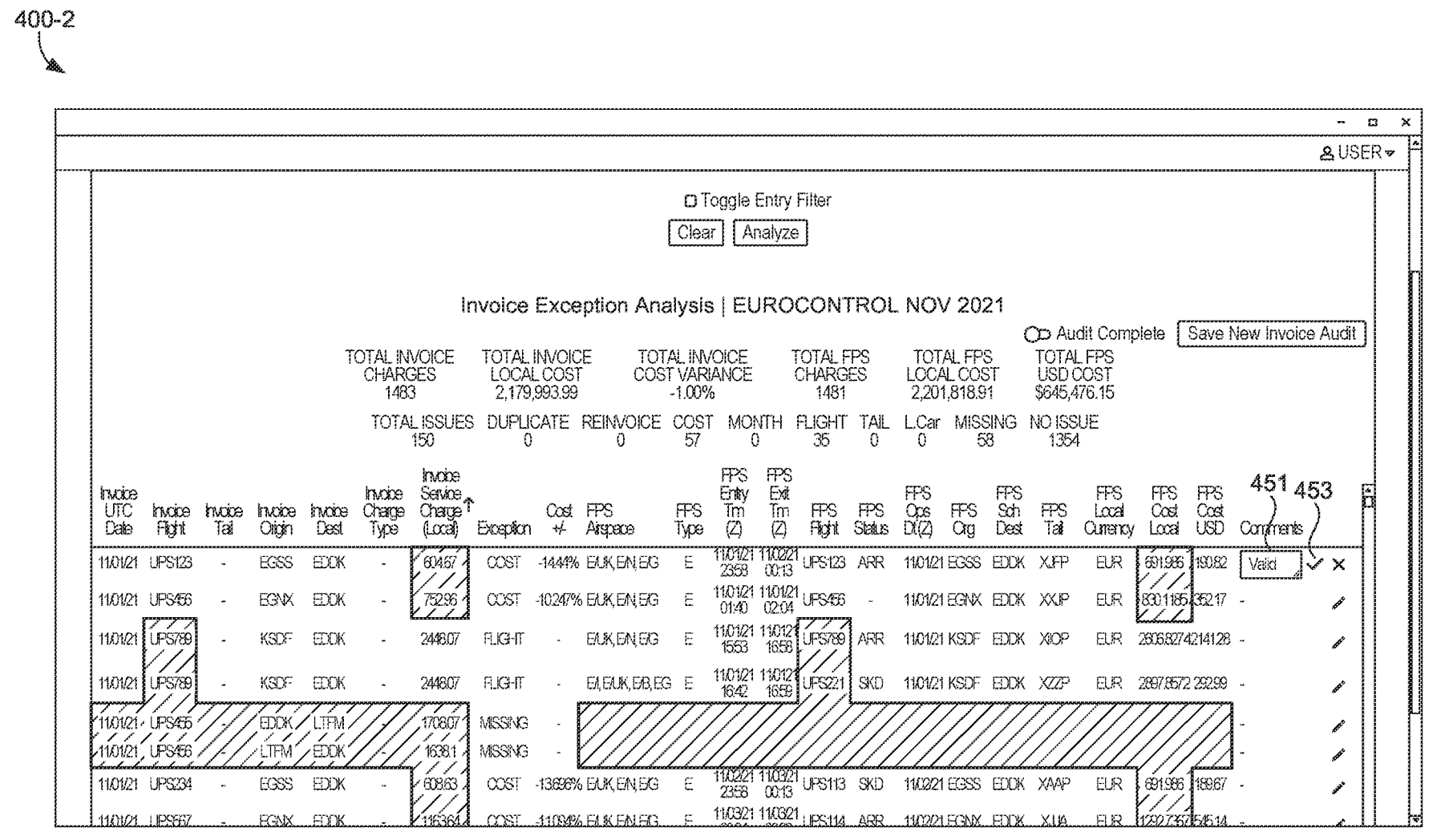

FIG. 4B is a screenshot of an example user interface illustrating more details with respect to the "comments" feature 450 and the "closed" feature 452 of FIG. 4A, according to some embodiments. In some embodiments, the functionality indicated in FIG. 4B includes functionality performed by the audit results tracking component 118 of FIG. 1.

In response to receiving an indication that the user has selected the "comments" indicator 450, particular embodiments cause presentation of the field 451, which is configured to receive natural language user input from the user. The field 451 can receive any string or characters that the user wishes to populate such field 451 with. In some embodiments, the field 452 will not be marked as "closed" (i.e., resolved) if and until a string is populated to the field 451 and an indication that the user has selected the indicator 453 (e.g., a request to store, in computer storage, the string(s) in the field 451). Accordingly, without receipt of such string to the field 451, particular embodiments do not populate the field 452 (and/or save the invoice via selection of the button 436) regardless of whether or not the user provides input or requests such population because the user needs to provide a comment. In some embodiments, once an entire invoice audit has been deemed entirely resolved by the user, the audit can be toggled as complete and saved.

Figure 5:
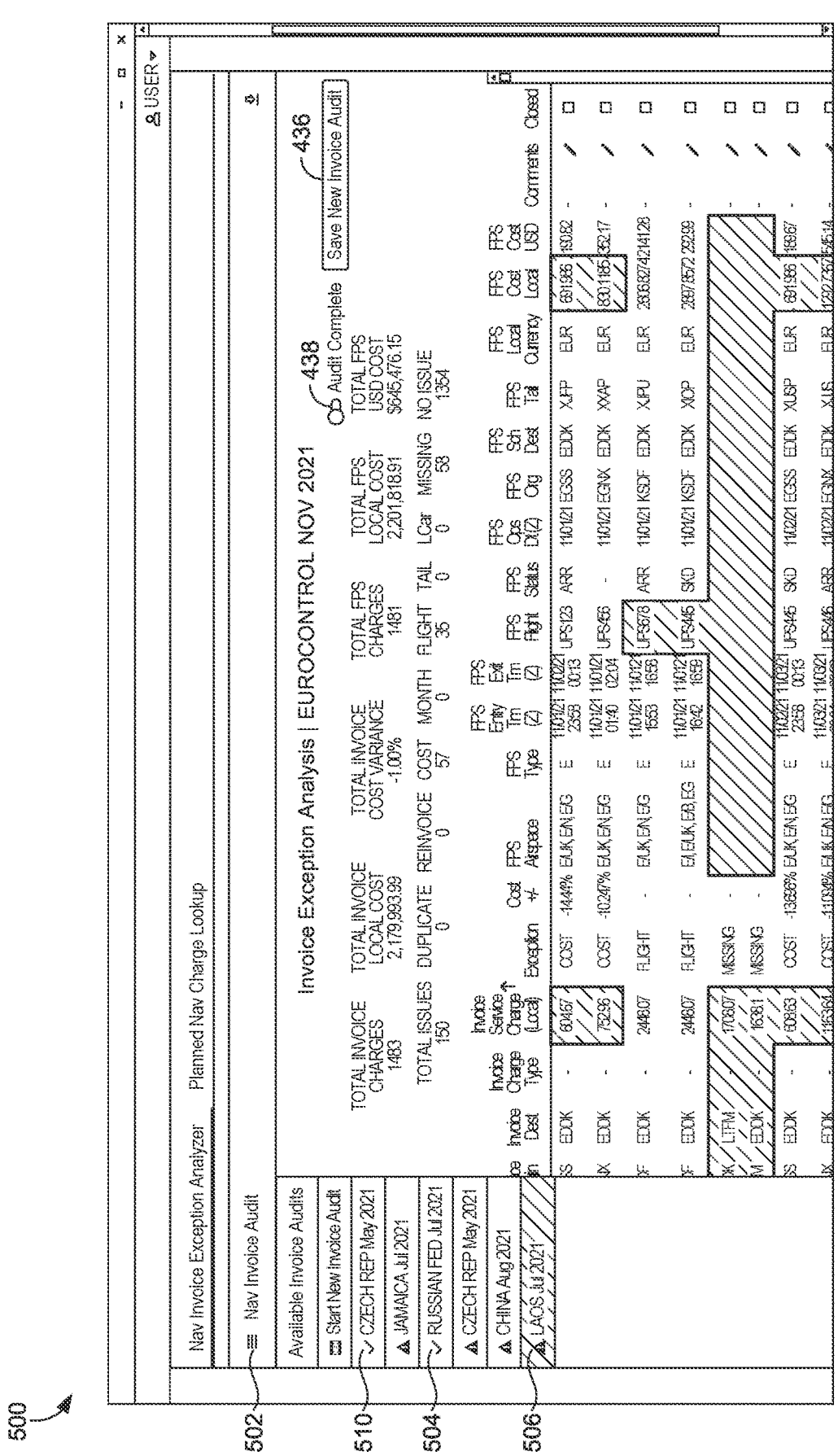
FIG. 5 is a screenshot of an example user interface indicating how to complete an audit and save results, according to some embodiments.

FIG. 5 is a screenshot 500 of an example user interface indicating how to complete an audit and save results, according to some embodiments. In some embodiments, in response to receiving an indication that the user has selected the "Nave Invoice Audit" user interface element 502, particular embodiments cause presentation of the window pane 510, which lists each title of each audit and indicates whether the corresponding audit has been completed. For example, with respect to the audit corresponding to FIG. 4A, the exclamation point indicator 506 indicates that the audit has not been completed for LAOS July 2021. In some embodiments, in response to receiving an indication that the user has selected the "Audit Complete" user interface element 438, particular embodiments activate a field such that the "Save" button 436 is selectable. Accordingly, the user may not be able to save audit results if and until they first select the "Audit Complete" user interface element 438. In some embodiments, in response to receiving an indication that both user interface elements 438 and 436 have been selected, particular embodiments change the explanation point indicator 506 to a checkmark, which is identical to the checkmark 504.

Figure 6A:
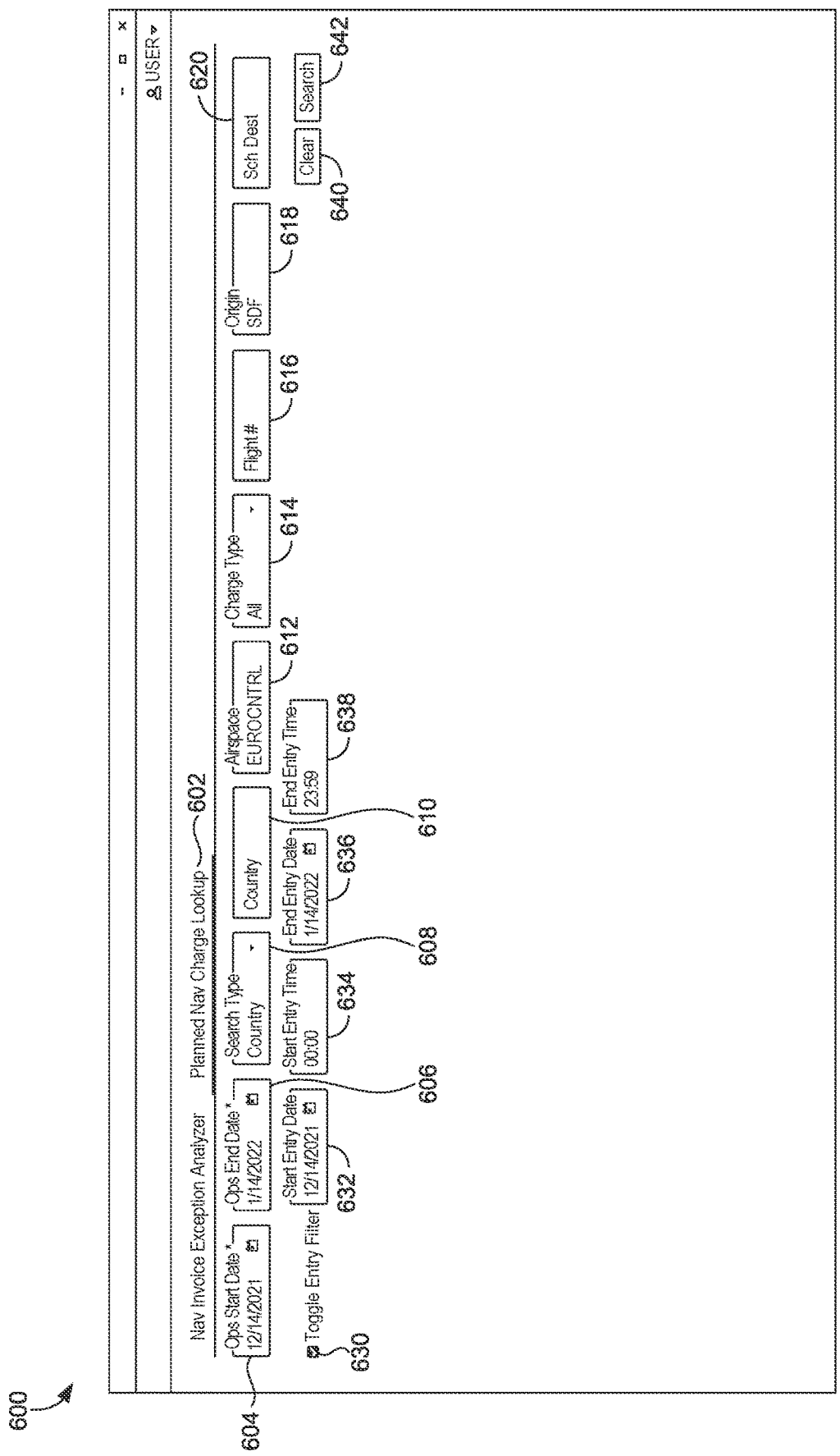
FIG. 6A is a screenshot of a user interface used to aid users in manually validating and resolving exceptions, according to some embodiments.

FIG. 6A is a screenshot 600 of a user interface used to aid users in manually validating and resolving exceptions, according to some embodiments. In some embodiments, the functionality illustrated in FIG. 6 includes functionality performed by the filtering module 122 of the planned charge lookup component 120 of FIG. 1.

In response to receiving an indication that the user has selected the "planned nav charge lookup" indicia 602, particular embodiments cause presentation of the fields 604, 606, 608, 610, 612, 614, 616, 618, and 620. In this way, the user can select one or more parameters (or fields) to filter results for expected charges. The "Ops start date" field 606 and "Ops end date" field 606 indicates a range of scheduled departure dates for historical flights associated with expected charges. For example, in response to receiving an indication that a user has input a first date-08/05/2022—in the field 604 and a second date-10/05/2022—in the field 606, the filtering module 122 makes a programmatic call to the FPS component 108, which then calls the FPS service, which then returns all flight departures between 08/05/2022 and 10/05/2022.

The "Search type" field 608 indicates a toggle to search for expected FPS charges by country or provider, since some countries may have multiple associated providers. The "country" field 610 (or provider field) indicates an identifier of a country or provider associated with the expected charges. The "airspace" field 612 indicates an identifier of the airspace associated with the expected charges. For example, in response to receiving an indication that the user has put in a first code identifying a first airspace, the filtering module 122 may call the FPS component 108, which then receives expected charges of all historical flights that have flown through the first airspace as searched for by the first code.

The "charge type" field 614 indicates an identity of the charge type associated with the expected FPS charges.

Example charge types can be "All," "E-ERC," "C-COM," "M-MET," T-TNC," and "V-VSAT." For example, the FPS component 108 can return all expected costs only for charge type "E" and no other charges.

The "flight #" field 616 indicates the flight number of flights associated with the expected charges. For example, the FPS component 108 can return only those expected charges for a specific identified flight. The "origin" field 618 indicates the identity of the origin location of departure of flights associated with FPS expected charges. For example, the FPS component 108 can return expected charges only for those flights that have departed out of a particular country, airport, geo-coordinates, or the like.

The "Sch Dest" field 620 indicates the identity of the scheduled destination of flights associated with the FPS expected charges. For example, the FPS component 108 can return expected charges only for those flights that have arrived or landed in a particular country, airport, geo-coordinates, or the like.

In response to receiving an indication that the user has selected the "toggle entry filter" user interface element 630, particular embodiments cause presentation of the fields 632, 634, 636. Each of these fields indicate the range of aircraft entry dates and time for flights associated with FPS expected charges. For example, the FPS component 108 may return charges for those flights that have entered a particular airspace between 5 p.m. on date 1 and 10 a.m. the next day on date 2 based on user selections made at the fields 632, 634, 636, and 638.

In response to receiving an indication that the user has selected the "clear" button 640, particular embodiments erase all the values of the fields 604, 606 608, 610, 612, 614, 616, 618, 620, 630, 632, 634, 636, and/or 638. In response to receiving an indication that the user has selected the "search button" 642 particular embodiments cause search results to be presented according to the criteria specified in each of the fields of FIG. 6A, as described in more detail below.

FIG. 6B is a screenshot 600-1 of an example user interface illustrated how search results associated with expected charges are surfaced, according to some embodiments. In some embodiments, the functionality indicated in FIG. 6B is performed by the charge summary module 124 and the charge results attributes 126 of the planned charge lookup component 120 of FIG. 1.

In response to receiving an indication that the user has selected the "search" button 642, particular embodiments compute and/or return the summary of charges 650 and table 652 of fields and values. In other words, after a user submits the search query, a table 650 of all FPS expected charges is caused to be displayed, which is preceded by a short summary of the charges 650.

The summary of charges 650 includes a "Charge Count" field and corresponding value (371), a "Flight Count" field and corresponding value (86), and a "Total Cost (USD)" field and corresponding value ($329, 914.93). In some embodiment, the computations/searching of these fields is performed by the charge summary module 124, as described with respect to FIG. 1. The "Charge Count" field indicates the quantity of unique service charges or line item charges found. A "line item" in this context refers to a specific service and corresponding charges for which a single entry that appears on a single line in an invoice is presented.

The "Total Cost (USD)" field of the summary 650 refers to the total cost in US dollars of all found FPS expected charges. For example, in response to receiving an indication that the user has selected the "search" button 642, the charge summary module 124 makes a programmatic call to the FPS component 108, which then queries the FPS service to return the total cost, in US dollars, of the total monetary amount of all expected charges for flying over (or landing in) country X (or other filter indicated by the filtering module 122), which may, for example, be a summation of all service charges. In some embodiments, the summary 650 additionally or alternatively includes a "Total Cost (Local)" field, which indicates a total cost of all found FPS expected charges in their respective local currencies. In some embodiments, if multiple currencies are found in the search, each currency is listed separately.

In some embodiments, the charge result attribute module 126 of FIG. 1 is responsible for generating and producing the table 652 and all corresponding fields and values. As illustrated in the table 652, there are (or may be) different fields. The "Country" field indicates the country associated with the individual service charge or record (entry). The "Provider" field indicates the provider associated with the individual service charge or record. The "Airspace" field indicates the particular airspace ID associated with the particular service charge or record.

The "Type" field indicates the service charge type. The "Entry Tm (Z)" field indicates the entry time of the flight associated to the service charge. In other words, for a given flight and charge, the "Entry Tm (Z)" field indicates the clock time (e.g., 4 p.m.) and/or date that a particular aircraft entered a country's airspace. The "Flight #" field indicates the flight number of the flight associated with the service charge. The "Status" field indicates the actual status (e.g., "cancelled" or "on schedule") of the flight associated to the service charge. This field is used to confirm that the operation of the planned flight took place. In some instances, canceled flights should not be invoiced.

The "Ops Dt (Z)" field indicates the scheduled departure date of the flight associated with the individual service charge or record. The "Org" field indicates the origin (e.g., country, airport, and/or geo-coordinates) of the flight associated with the service charge. The "Sch Dest" field indicates and identifies the scheduled destination (e.g., country, airport, and/or geo-coordinates) of the flight associated to the service charge or record. The "Tail" field indicates the aircraft registration number of the flight associated to the service charge. The "Entry" field indicates the airspace entry point of the flight associated to the service charge. For example, such "entry point" can refer to the time and/or location (e.g., geo-coordinates) that an aircraft entered a particular airspace.

The "Exit" field indicates the airspace exit point of the flight associated to the service charged. For example, such "exit point" can refer to the time and/or location that the same aircraft (indicated in the "entry" field) exited the particular airspace. The "Local Currency" field indicates the local currency identifier or type (e.g., USD) of the country issuing the service charge. The "Cost Local" field indicates the cost of the service charge in the local currency of the country issuing the service charge. The "Cost USD" field indicates the cost of the service charge in US dollars.

Figure 7A:
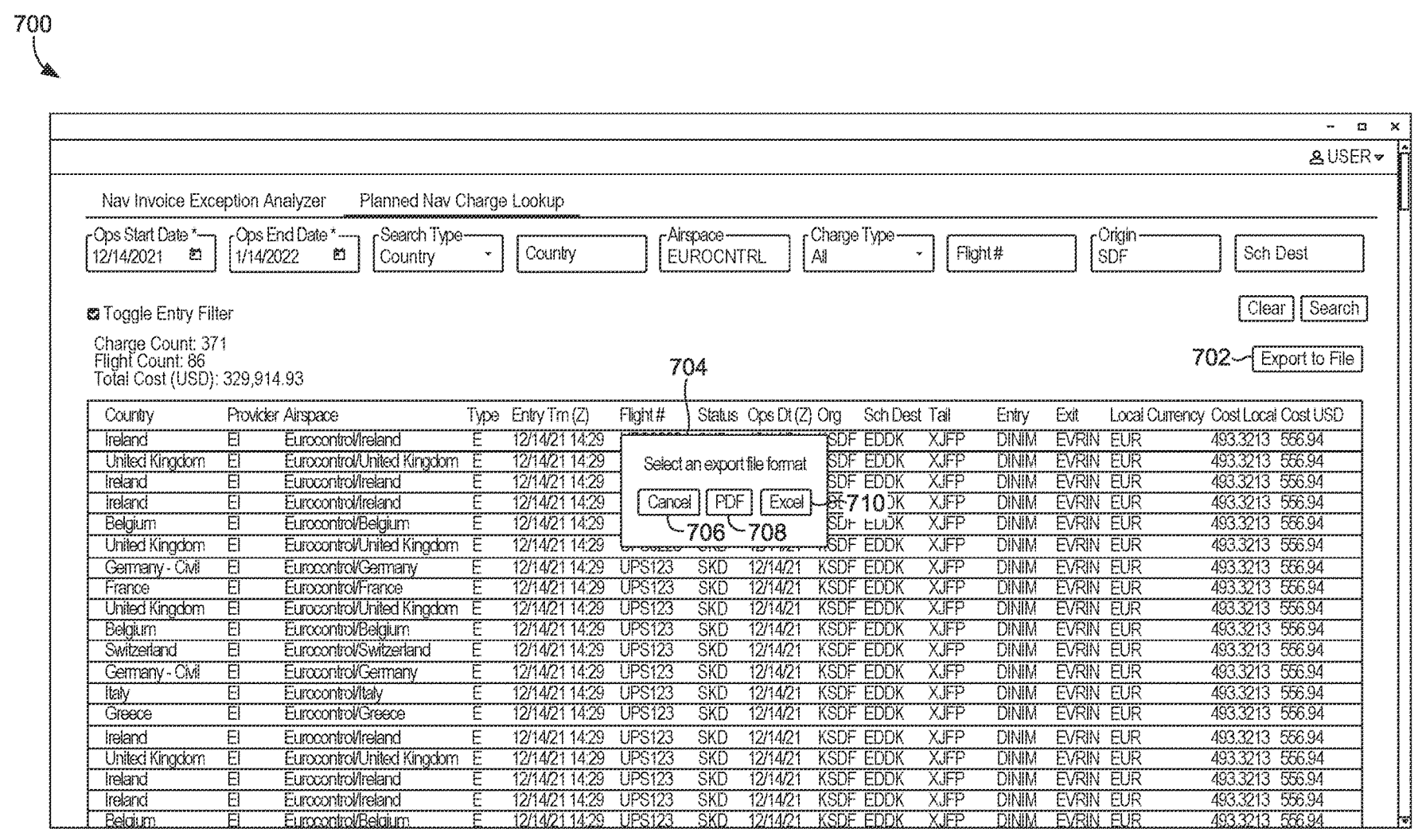

FIG. 7A is a screenshot 700 of an example interface for exporting analysis results to a particular file format, according to some embodiments. In some embodiment, the functionality indicated in FIG. 7A is performed by the export component 128 of FIG. 1. In an illustrative example, the data indicated in FIG. 4A can be exported to a particular file format. In another example, the data indicated in the summary 650 and table 652 can be exported to a particular file. In response to receiving an indication that the user has selected the "export to file" button 702, particular embodiments cause presentation of the window 704, which provides different formatting options-"PDF" and "Excel"- to produce the results in. In response to receiving an indication that the user has selected the "cancel" button 706, particular embodiments remove the window 704 such that the process to request exporting to a file is terminated.

FIG. 7B is a screenshot 700-1 of an example user interface for exporting document exception analyses into a PDF format, according to some embodiments. In some embodiments, the functionality indicated in FIG. 7B is produced by the export component 128, as described with respect to FIG. 1. In some embodiments, in response to receiving and indication that the user has selected the "PDF" button 708, the export component 128 performs its functionality, and the output is the presentation of the screenshot 700-1. Such output may resemble, for example, the analyses performed by the document exception analyzer 112 (e.g., FIG. 4A).

Figure 7C:
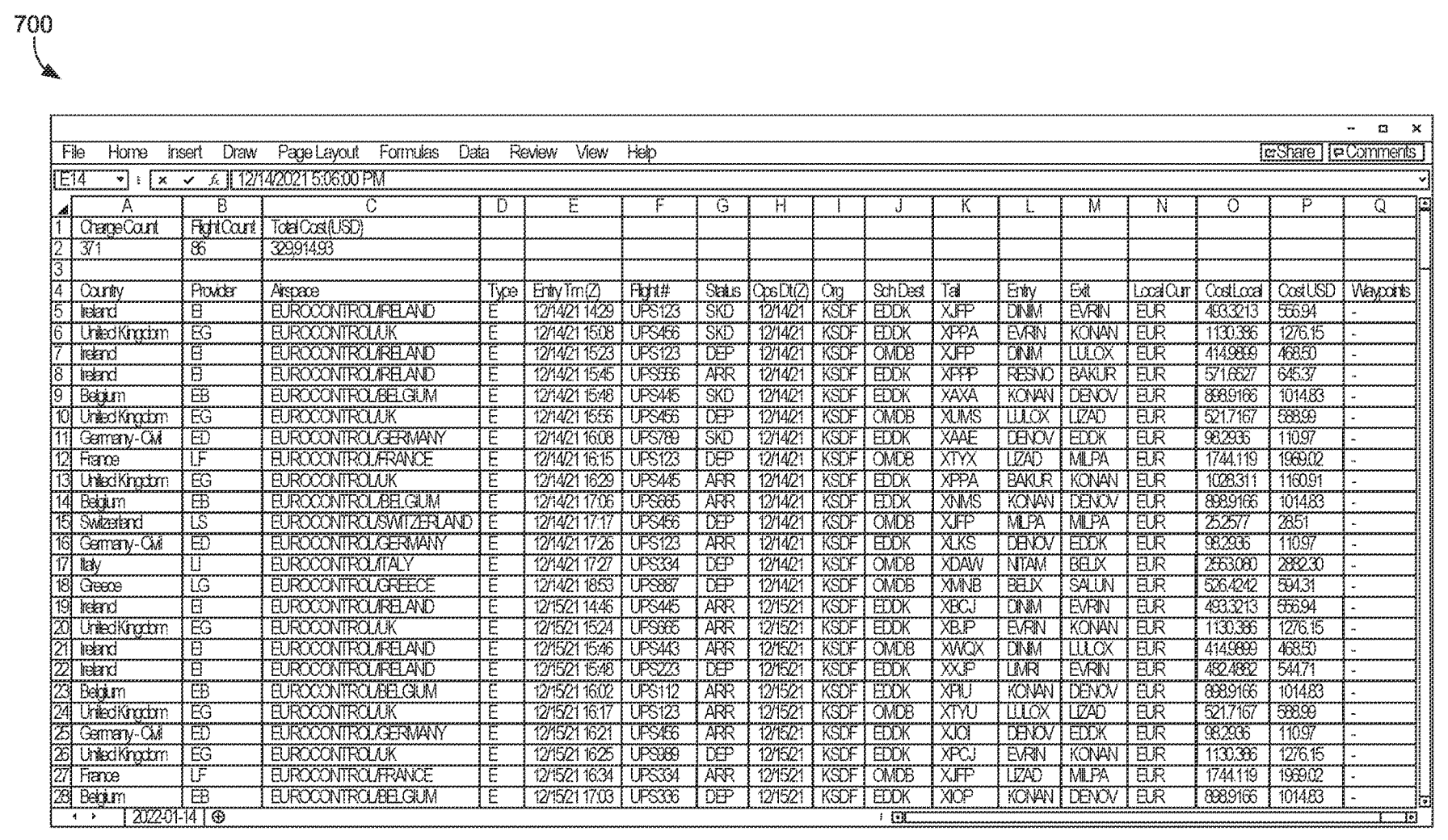

FIG. 7C is a screenshot 700-2 of an example user interface for exporting planned charged lookup analyses into an EXCEL format, according to some embodiments. In some embodiments, the functionality indicated in FIG. 7C is produced by the export component 128, as described with respect to FIG. 1. In some embodiments, in response to receiving and indication that the user has selected the "EXCEL" button 710, the export component 128 performs its functionality, and the output is the presentation of the EXCEL document 730. Such output may resemble, for example, the analyses performed by the planned charge lookup component 120 of FIG. 1 (e.g., the table 652 of FIG. 6B).

IV. Example Flow Diagram

Figure 8:
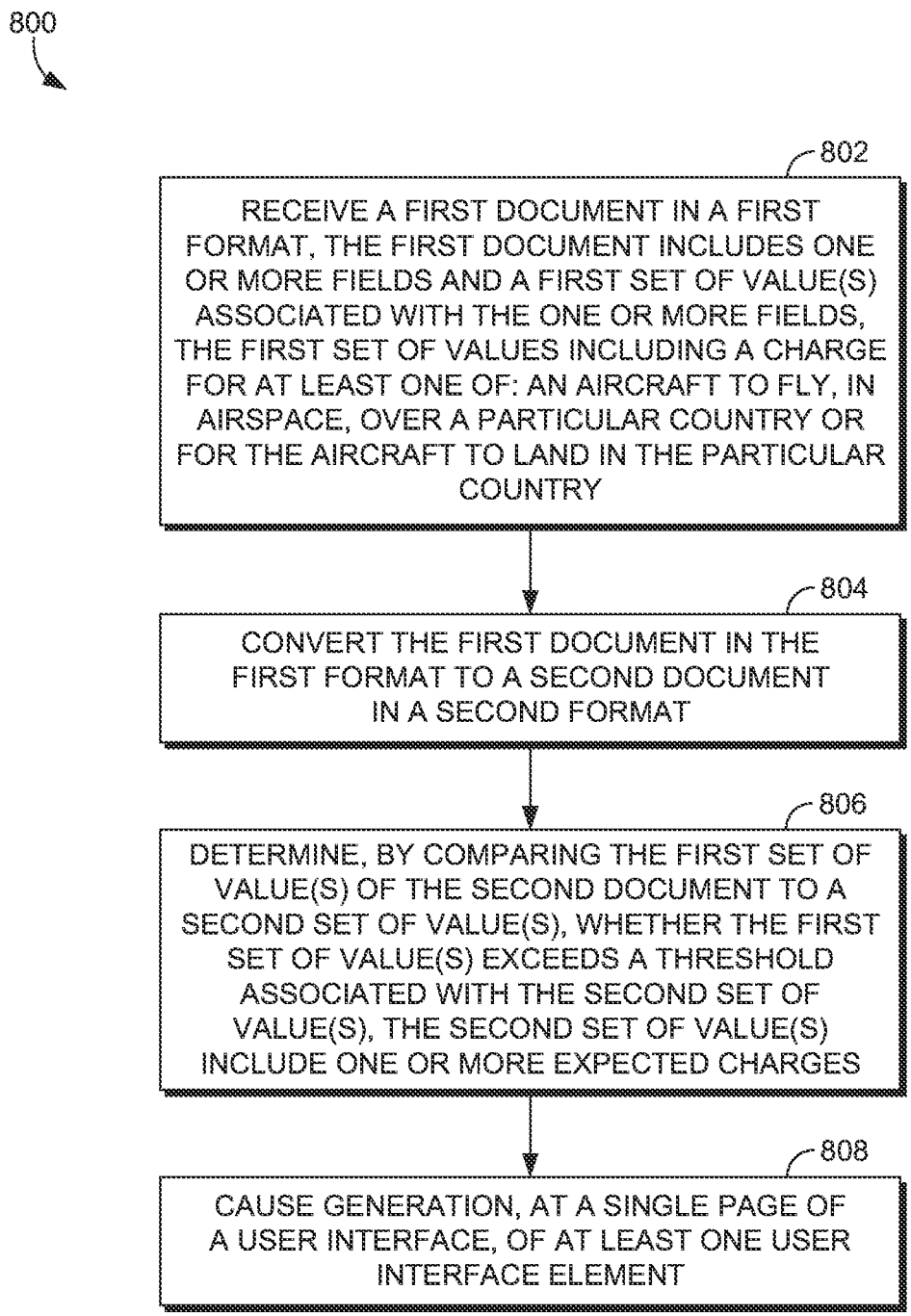
FIG. 8 is a flow diagram of an example process for determining that at least one value is a constituent of a keyword, according to some embodiments.

FIG. 8 is a flow diagram of an example process 800 for determining that at least one value is a constituent of a keyword, according to some embodiments. The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 7C). The computer-implemented method, the system (that includes at least one computing device having at least one processor and at least one computer readable storage medium), and/or the computer readable medium as described herein may perform or be caused to perform the process 800 or any other functionality described herein.

Per block 802, some embodiments receive a first document in a first format, where the first document includes one or more fields and a first set of one or more values associated with the one or more fields. The first set of one or more values include a charge for at least one of: an aircraft to fly, in airspace, over a particular country (e.g. an overfly charge) or for the aircraft to land in the particular country (e.g., a landing charge). In some embodiments, the one or more fields are represented in natural language. For example, embodiments can receive an overfly audit invoice in PDF format with various fields, such as "UTC date," "FLIGHT," "TAIL," "ORIGIN," "DESTINATION," "CHARGE TYPE," and "SERVICE CHARGE," as described herein. The "charge" can be any suitable cost described herein, such as an overall total overfly cost, a particular service charge, or the like. The "values" can include any suitable numerical value that is a constituent or belongs to a corresponding field. For example, for the field "TOTAL COST," the value can be "$3000," which indicates the total cost value.

Per block 804, some embodiments convert the first document in the first format to a second document in a second format. For example, particular embodiments convert a PDF invoice into a HTML, JSON, or comma-delimited file of .CSV. In some embodiments, the conversion at block 804 includes (or is preceded by) OCR and/or ETL steps, as described with respect to the OCR module 104 and/or the document conversion module 106. For example, some embodiments convert the first document into a machine-readable bitmap image. In some embodiments, the "machine-readable bitmap image," is a two-color, or black and white, image. In some embodiments, the scanned-in image or bitmap is analyzed for light and dark areas, where the dark areas are identified as characters that need to be recognized and light areas are identified as background. Further, at least partially in response to the converting into the machine-readable bitmap image, some embodiments detect, at the machine-readable bitmap image, each field of the one or more fields and each value, of the value(s). In some embodiments, such functionality represents OCR functionality described herein, such as pattern recognition or feature detection to recognize or parse individual letters, words, or the like.

Continuing with this example at block 804, in some embodiments, based at least in part on the detecting, some embodiments extract the value(s) from the bitmap image and encode a data structure with the value(s). For example, some embodiments can copy the values to a lookup table, a hash table, or other data structure associated with a file (e.g., a HTML). Based at least in part on the encoding, some embodiments generate a second document with the value(s), where the second document is in a second format. For example, particular embodiments extract the value(s) from the data structure and write them to an output file, such as HTML, JSON, or the like. For example, the output file can be an HTML file, which represents document 210 of FIG. 2B.

In some embodiments, block 804 can alternatively or additionally include detecting each field of the one or more fields and each value of the value(s) in response to the receiving. For example, the first document may already be in a suitable format type so there is no need to perform OCR or other document conversion functionality to make it machine-readable. In these instances, particular embodiments perform detect fields or values via word matching, semantic similarity matching, or the like. Based at least in part on the detecting, some embodiments extract the value(s) from the first document and encode (e.g., write to or populate) a data structure (e.g., a hash map) with the value(s).

In some embodiments, subsequent to (or as a part of) the conversion at block 804 some embodiments validate the first format by determining whether each field, of the one or more fields, match a corresponding predetermined field (e.g., via TF-IDF as described herein) or whether each field is semantically similar (e.g., via a BERT model as described herein), via a distance measurement (e.g., Euclidean or Cosine), to the corresponding predetermined field. In some embodiments, such functionality includes or represents the functionality as described with respect to the field check module 107 of FIG. 1. A "predetermined field" as described herein refers to a field that is stored to a hash map or other data structure in computer storage, which acts as a ground truth field needed to validate the document. For example, a conditional statement may indicate that to validate a document, the document must contain a "TAIL" field.

Per block 806, some embodiments determine (e.g., based on the generating of the second document), by comparing the first set of value(s) of the second document to a second set of value(s), whether the first set of value(s) exceeds a threshold associated with the second set of value(s). The second set of value(s) include one or more expected charges. In some embodiments, the one or more expected charges are any expected individual or total cost described herein, such as any individual expected service cost, an individual expected overfly charge, an individual expect landing charge, or a total expected cost. In some embodiments, the one or more expected charges are associated with the first document. For example, the one or more expected charges may be for the same country, airspace, charge type, or the like as indicated in the first document. In some embodiments, the one or more expected charges include or indicate one or more expected charges for the aircraft to fly over the particular country (overfly charge) or one or more expected charges for the aircraft to land in the particular country (landing charge).

In some embodiments, the "threshold" as described with respect to block 806 refers to any of the exceptions as described herein with respect to the exception module 116-5 of FIG. 3 or FIG. 4A, such as the "COST" field, the "DUPLICATE" field, the "FLIGHT" field, the "TAIL" field, the "MISSING" field, or the like. For example, with respect to the COST field, the threshold may be an acceptable cost variance threshold (e.g., 10%). With respect to the DUPLICATE field, the threshold may be 0, where any charges appearing more than once on the same invoice is responsively incremented past 0 (e.g., to 10). With respect to the TAIL field, the threshold may be 0 and where the field is incremented past 0 every time the invoice (e.g., the first document) charge (or line item) matches an expected charge on all fields except for the tail number. With respect to the "MISSING" field, the threshold may be 0 and where the field is incremented past 0 every time an individual invoice charge cannot be matched to any corresponding expected charge. In this way at least some of the first set of value(s) and the second set of value(s) need not be monetary costs or charges but can be or include counts or other suitable values.

Some embodiments receive, prior to the determining whether the first set of value(s) exceeds the threshold (i.e., block 806) and via a user selection of one or more parameters from the first page of the user interface, a request to filter an output for the determining, where the determining of whether the first set of value(s) exceeds the threshold is based on the user selection. In some embodiments, this includes the functionality as described with respect to the filtering module 114 of FIG. 1 and/or FIG. 3A. For example, the one or more parameters can include at least one of: a first indicator of a particular country (e.g., field 306 of FIG. 3A or "Country" field), a second indicator of the airspace (e.g., an "Airspace" field or field 308 of FIG. 3A), a third indicator of a charge type associated with the first document (e.g., a "Charge Type" field or field 309 of FIG. 3A), a fourth indicator of a cost variance limit (e.g., a "Cost Variance Limit field or field 310 of FIG. 3A), and indicators of a range of flight dates associated with the second set of value(s) (e.g., the "Start Date" or "End Date" fields, such as 302 or 304 of FIG. 3A).

In addition to block 806, some embodiments compute (e.g., by adding together) a total quantity of charges indicated in the second document and cause presentation, to the single page of the user interface, of a first indication of the total quantity. For example, in some embodiments, such total quantity of charges refers to the "TOTAL INVOICE CAHRGES," as described and displayed with respect to 404 of FIG. 4A. In additional to block 806, some embodiments compute (e.g., by summing each individual service charge value) a total cost indicated in the second document in a local currency of the particular country and cause presentation, to the single page of the user interface, of the second indication of the total cost. For example, in some embodiments, such "total cost" refers to the "TOTAL INVOICE LOCAL COST (e.g., 404), as described and displayed in the screenshot 400 of FIG. 4.

In addition to block 806, some embodiments compute a total cost variance of the second document based on a difference between the charge of the first set of value(s) and the one or more expected charges and cause display, to the single page of the user interface, of a third indication of the total invoice cost variance. For example, in some embodiments, such calculation can be of the "TOTAL INVOICE COST VARIANCE," or "COST" (e.g., field 406 or 422) as described with respect to FIG. 4A.

In addition to block 806, some embodiments compute a total quantity of flight planning charges associated with the second set of value(s) and cause presentation, at the first page of the user interface, of another indication of the total quantity of flight planning charges. For example, in some embodiments, such total quantity of flight planning charges refers to the "TOTAL FPS charges"-field 408—of FIG. 4A.

In addition to block 806 some embodiments compute a total cost (e.g., by summing together the costs) indicated in one or more historical documents associated with the second set of value(s) and cause presentation, at the singe page of the user interface, of another indication of the total cost indicated in the one or more historical documents. For example, in some embodiments such total cost refers to the "TOTAL FPS LOCAL COST" (e.g., field 410) of FIG. 4A.

Per block 808, some embodiments cause generation, at a single page of a user interface, of at least one user interface element. In some embodiments, block 808 is performed at least partially in response to the determining at block 806. Examples of block 808 include any of the fields or values described with respect to FIG. 4A.

In some embodiments, a first user interface element indicates whether the first value(s) exceeds the threshold. For example, with respect to FIG. 4A, the first user interface element can be the "0" value underneath the "COST" field 422 and/or the "−3.40%" value underneath the "TOTAL INVOICE COST VARIANCE" field 406. In some embodiments, the user interface element indicates a total quantity of charges indicated in the second document (e.g., the "52" count underneath the "TOTAL INVOICE CHARGES" field 402).

In some embodiments, a second user interface element indicates a total cost indicated in the second document (e.g., the value underneath the "TOTAL INVOICE LOCAL COST" field 404). In some embodiments, a third user interface element indicates a total invoice cost variance of the second document, where the total invoice cost variance corresponds to a difference between the charge of the first set of value(s) and the one or more expected charges (e.g., the "−3.40% value underneath the "TOTAL INVOICE COST VARIANCE field 406).

In some embodiments, a fourth user interface element indicates a total quantity of flight planning charges associated with the second set of one or more values (e.g., the values underneath the "TOTAL FPS CHARGES 408). In some embodiments, a fifth user interface element indicates a total cost in one or more historical document associated with the second set of value(s) (e.g., the values underneath the "TOTAL FPS USD COST field 412). In some embodiments, other user interface elements can cause to be presented, such as any of the exception values described with respect to the fields 416, 418, 420, 422, 424, 426, 428, 430, 432, and 434.

Some embodiments additionally convert the first page of the user interface into another form in response to receiving a user request to export the first page. For example, in response to receiving an indication that the user has selected the PDF button 708 or the EXCEL button 710 of FIG. 7A, particular embodiments convert the results to the selected format, as described with respect to the export component 128 of FIG. 1.

In some embodiments, block 808 includes causing visual data to be superimposed over one or more values at the first page, where the visual data indicates that the threshold has been exceeded and/or exceptions have been found with the value(s) that have been superimposed over. For example, referring back to FIG. 4A, the visual data 460 is superimposed over a particular line item/charge and all field values, where the exception found was "MISSING," as illustrated in 470, which indicates that for this particular charge, it could not be matched to any FPS expected charge.

Some embodiments receive an indication that the user has input, at the single page of the user interface, a set of natural language characters. And in response to the receiving of the indication, particular embodiments activate a first process (e.g., trigger a first routine) that is configured to allow a closing of a line item and activate a second process (e.g., trigger a second routine) that is configured to allow a storing, in computer memory, of results associated with the first user interface element that indicates whether the first set of one or more values exceeds the threshold. Such functionality is described with respect to "comments" user interface element 450 and "closed" user interface element 452 of FIG. 4A. In other words, in some embodiments, if and until (e.g., as laid out in a computer conditional statement) a user inputs a comment into a field, the corresponding charge may not be able to be closed out (or marked as completed) and the user may not be able to save any analysis results indicated in FIG. 4A.

Some embodiments receive, via a user selection of one or more parameters from the single page of the user interface, a request to derive information associated with the second set of value(s), where the one or more parameters include one or more of: a first set of identifiers indicating a range of scheduled departure dates (e.g., blocks 604 and 608 of FIG. 6A), a second identifier indicating a charge type (e.g., charge type 614 of FIG. 6A), a third identifier indicative of searching for the expected charges by country or provider (e.g., field 608), a fourth identifier of another airspace associated with the second set of value(s) (e.g., the airspace field 612 of FIG. 6A), a fifth identifier of a flight number associated with the second set of value(s) (e.g., field 616 of FIG. 6A), a sixth identifier of an origin of a flight associated with the second set of value(s) (e.g., the origin field 618 of FIG. 6A), a seventh identifier of a scheduled destination of a flight associated with the second set of value(s) (e.g., the field 620 of FIG. 6A).

In response to the receiving of the request to derive information associated with the second set of value(s), some embodiments derive (e.g., retrieve from a remote service or compute) the expected charges for at least one of: the country or provider, the another airspace, the flight number, the origin, the scheduled destination, the another airspace entry point of a flight associated with the expected charges (e.g., as indicated by fields 632 and 634), and another airspace exit point of the flight associated with the expected charges (e.g., as indicated by fields 636 and 638).

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

V. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

VI. Example Computing Environment

Figure 9:
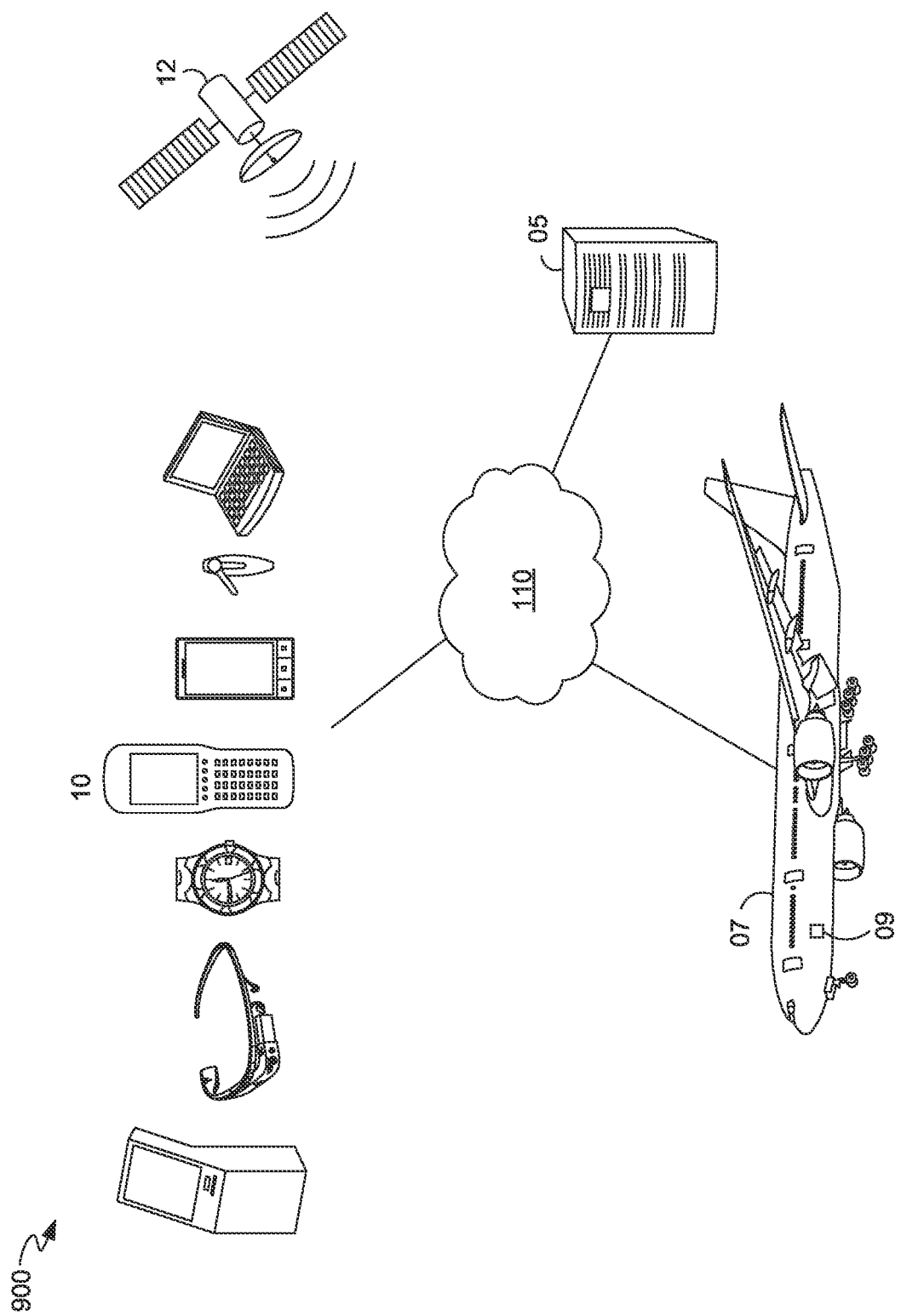
FIG. 9 is a schematic diagram of an example computing environment in which aspects of the present disclosure are employed in, according to some embodiments.
Figure 10:
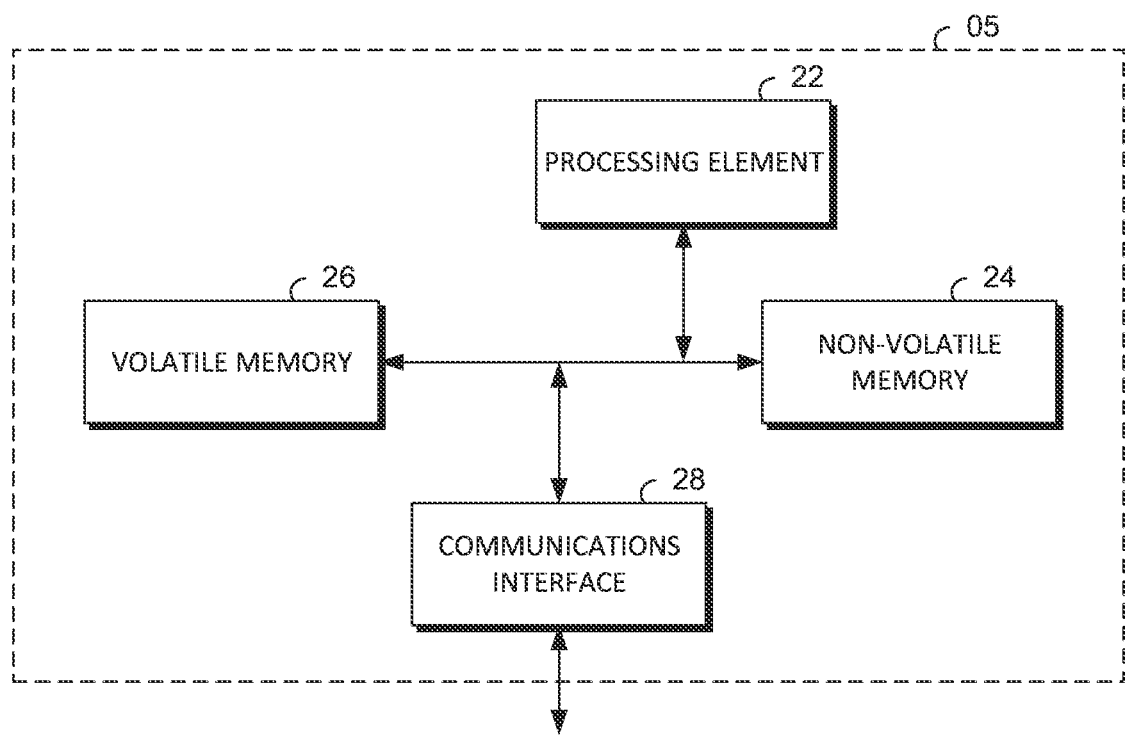
FIG. 10 is a block diagram of an analysis computing entity of FIG. 9, according to some embodiments.

FIG. 9 is a schematic diagram of an example computing environment 900 in which aspects of the present disclosure are employed in, according to some embodiments. As shown in FIG. 9, this particular environment 900 includes one or more aircraft 07, one or more analysis computing entities 05, one or more source computing entities 10, one or more satellites 12, one or more networks 110 (from FIG. 1), and/or the like. Each of these components, entities, devices, systems, and similar words used herein interchangeably may be in direct or indirect communication with, for example, one another over the same or different wired or wireless networks. Additionally, while FIG. 9 illustrates the various system entities as separate, standalone entities, the various embodiments are not limited to this particular architecture.

The analysis computing entity(s) 05 is generally responsible for determining whether first values (corresponding to overflight/landing charges) indicated in a converted document (e.g., a machine-readable invoice) exceed a threshold associated with second charges (corresponding to expected overflight/landing charges), and then causing presentation, at a single page of a user interface, of one or more user interface elements that at least partially indicate whether the threshold has been exceeded, as described herein. In some embodiments, the analysis computing entity(s) 05 includes one or more of the components of the system 100, such as the FPS component 108, the document exception analyzer 112, the planned charge lookup component 120, the export component 128, the presentation component 130, storage 105, and/or the document validator 102 of FIG. 1.

The source computing entity(s) 10 (or user device) is generally responsible for presenting user interface elements in association with the information determined via the analysis computing entity(s) 05. For example, in response to the analysis computing entity(s) 05 determining that a value exceeds a cost variance threshold, the analysis computing entity(s) 05 instructs, over the network(S) 110, the source computing entity(s) 10 (e.g., a DIAD) to superimpose visual data, at a user interface, over the value, similar to 460 of FIG. 4A. It is understood that in some embodiments, the source computing entity(s) 10 alternatively or additionally include one or more of the components of the system 100 of FIG. 1. For example, in some embodiments, the presentation component 130 is hosted at the source computing entity(s) 10 instead of the analysis computing entity(s) 05.

In various embodiments, the aircraft 07 includes one or more telematics sensor devices 09. The telematics sensor devices 09 sample various attributes of the aircraft 07, such as speed, location (e.g., via a GPS module), fuel consumption, and/or any other suitable type attributes of the vehicle 07 and transmit the data to the analysis computing entity 05 for analysis. In some embodiments, any of the historical flight data described herein, such as FPS data, is automatically derived via the telematics sensor devices 09. For example, in order to determine where a particular aircraft flew, how many miles were traversed, etc. a GPS or other module that acts as a telematics sensor device 09 may sample such data and store, in near-real-time, such data as a stream of values. Such data can be used by the FPS component 108, as described herein.

VII. Example Analysis Computing Entity

FIG. 10 is a block diagram of the analysis computing entity 05 of FIG. 9, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 05 may also include one or more communications interfaces 24 for communicating with various computing entities, such as by communicating data, content, information/data, and/or similar terms used herein interchangeably that can be transmitted, received, operated on, processed, displayed, stored, and/or the like.

As shown in FIG. 10, in particular embodiments, the analysis computing entity 05 may include or be in communication with one or more processing elements 20 (also referred to as processors, processing circuitry, and/or similar terms used herein interchangeably) that communicate with other elements within the analysis computing entity 05 via a bus, for example. As will be understood, the processing element 20 may be embodied in a number of different ways. For example, the processing element 20 may be embodied as one or more complex programmable logic devices (CPLDs), microprocessors, multi-core processors, coprocessing entities, application-specific instruction-set processors (ASIPs), microcontrollers, and/or controllers. Further, the processing element 20 may be embodied as one or more other processing devices or circuitry. The term circuitry may refer to an entirely hardware embodiment or a combination of hardware and computer program products. Thus, the processing element 20 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 20 may be configured for a particular use or configured to execute instructions stored in volatile or non-volatile media or otherwise accessible to the processing element 20. As such, whether configured by hardware or computer program products, or by a combination thereof, the processing element 20 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 22, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media (also referred to as volatile storage, memory, memory storage, memory circuitry and/or similar terms used herein interchangeably). In particular embodiments, the volatile storage or memory may also include one or more volatile storage or memory media 26, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 20. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 20 and operating system.

As indicated, in particular embodiments, the analysis computing entity 05 may also include one or more communications interfaces 24 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

VIII. Example Source Computing Entity

Figure 11:
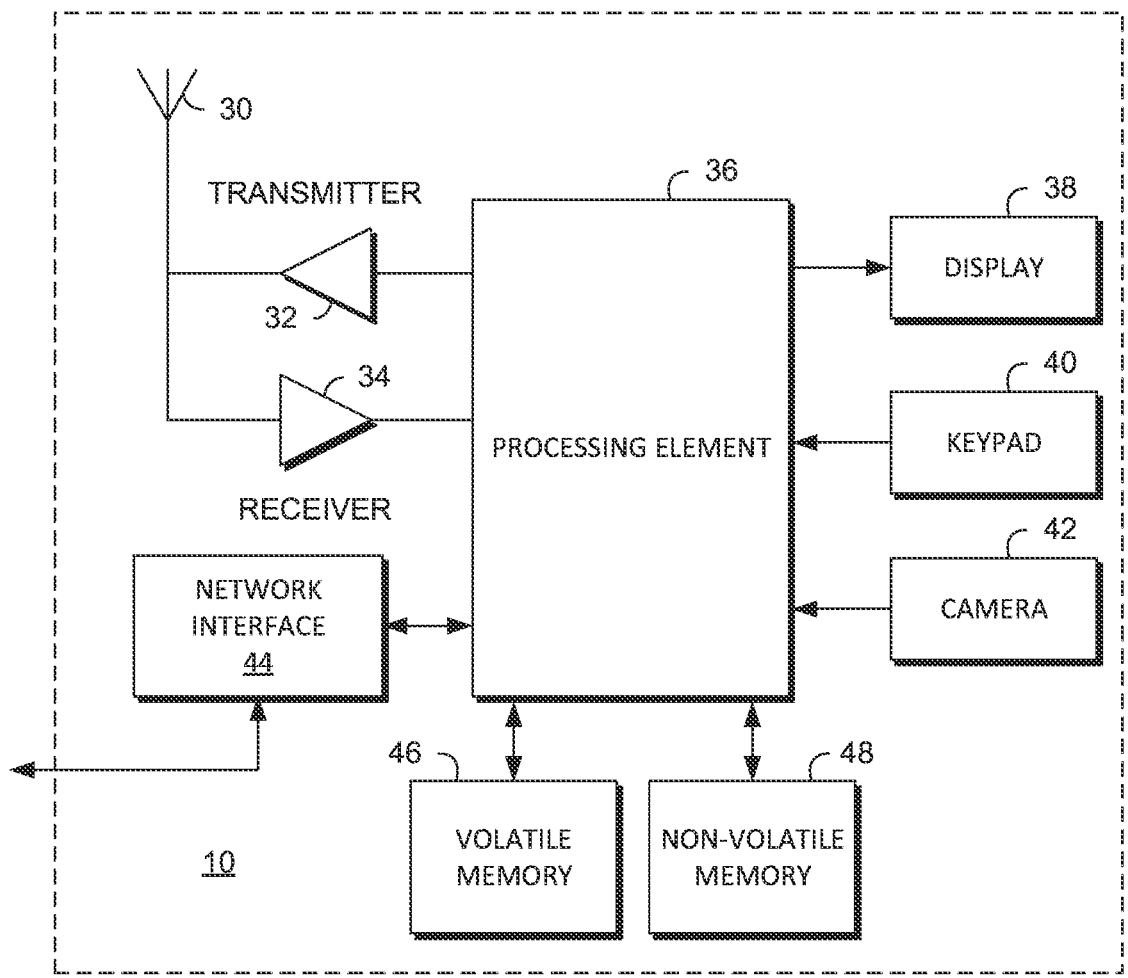
FIG. 11 is a block diagram of a source computing entity(s) of FIG. 9, according to some embodiments.

Turning now to FIG. 11, a block diagram of a source computing entity of FIG. 9, according to some embodiments. In certain embodiments, source computing entity(s) 10 may be embodied as handheld computing entities, such as mobile phones, tablets, personal digital assistants, and/or the like, that may be operated at least in part based on user input received from a user via an input mechanism. Moreover, source computing entity(s)10 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, source computing entity(s) 10 may be utilized as onboard controllers for UAVs configured for picking-up and/or delivering packages to various locations, and accordingly such source computing entity(s) 10 may be configured to monitor various inputs (e.g., from various sensors) and generated various outputs. It should be understood that various embodiments of the present disclosure may comprise a plurality of source computing entities 10 embodied in one or more forms (e.g., kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like-whether or not associated with a carrier. In particular embodiments, a user may operate a source computing entity 10 that may include one or more components that are functionally similar to those of the analysis computing entity 05. This figure provides an illustrative schematic representative of a source computing entity(s) 10 that can be used in conjunction with embodiments of the present disclosure. In general, the terms device, system, source computing entity, user device, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Source computing entity(s) 10 can be operated by various parties, including carrier personnel (sorters, loaders, delivery drivers, network administrators, and/or the like). As shown this figure, the source computing entity(s) 10 can include an antenna 30, a transmitter 32 (e.g., radio), a receiver 44 (e.g., radio), and a processing element 36 (e.g., CPLDs, microprocessors, multi-core processors, coprocessing entities, ASIPs, microcontrollers, and/or controllers) that provides signals to and receives signals from the transmitter 32 and receiver 34, respectively. In some embodiments, the source computing entity(s) 10 additionally includes other components not shown, such as a fingerprint reader, a printer, and/or the camera.

The signals provided to and received from the transmitter 32 and the receiver 34, respectively, may include signaling information in accordance with air interface standards of applicable wireless systems. In this regard, the source computing entity(s) 10 may be capable of operating with one or more air interface standards, communication protocols, modulation types, and access types. More particularly, the source computing entity(s) 10 may operate in accordance with any of a number of wireless communication standards and protocols, such as those described above with regard to the analysis computing entity(s) 05. In a particular embodiment, the source computing entity(s) 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the source computing entity(s) 10 may operate in accordance with multiple wired communication standards and protocols, such as those described above with regard to the analysis computing entity(s) 05 via a network interface 44.

Via these communication standards and protocols, the source computing entity(s) 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The source computing entity(s) 10 can also download changes, add-ons, and updates, for instance, to its firmware, software (e.g., including executable instructions, applications, program modules), and operating system.

According to particular embodiments, the source computing entity(s) 10 may include location determining aspects, devices, modules, functionalities, and/or similar words used herein interchangeably. For example, the source computing entity(s) 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the source computing entity(s) 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The source computing entity(s) 10 may also comprise a user interface (that can include a display 38 coupled to a processing element 36) and/or a user input interface (coupled to a processing element 36). For example, the user interface may be a user application, browser, user interface, and/or similar words used herein interchangeably executing on and/or accessible via the source computing entity 10 to interact with and/or cause display of information from the analysis computing entity 05, as described herein. The user input interface can comprise any of a number of devices or interfaces allowing the source computing entity(s) 10 to receive information/data, such as a keypad 40 (hard or soft), a touch display, voice/speech or motion interfaces, or other input device. In embodiments including a keypad 40, the keypad 40 can include (or cause display of) the conventional numeric (0-9) and related keys (#, *), and other keys used for operating the source computing entity(s) 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in this figure, the source computing entity(s) 10 may also include an camera 42, imaging device, and/or similar words used herein interchangeably (e.g., still-image camera, video camera, IoT enabled camera, IoT module with a low resolution camera, a wireless enabled MCU, and/or the like) configured to capture images. The source computing entity(s) 10 may be configured to capture images via the onboard camera 42, and to store those imaging devices/cameras locally, such as in the volatile memory 46 and/or non-volatile memory 48. As discussed herein, the source computing entity(s) 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 42. The contextual data may be stored as a portion of the image (such that a visual representation of the image data includes the contextual data) and/or may be stored as metadata associated with the image data that may be accessible to various computing entity(s) 10.

The source computing entity(s) 10 may include other input mechanisms, such as scanners (e.g., barcode scanners), microphones, accelerometers, RFID readers, and/or the like configured to capture and store various information types for the source computing entity(s) 10. For example, a scanner may be used to capture parcel/item/shipment information/data from an item indicator disposed on a surface of a shipment or other item. In certain embodiments, the source computing entity(s) 10 may be configured to associate any captured input information/data, for example, via the onboard processing element 36. For example, scan data captured via a scanner may be associated with image data captured via the camera 42 such that the scan data is provided as contextual data associated with the image data.

The source computing entity(s) 10 can also include volatile storage or memory 46 and/or non-volatile storage or memory 48, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the source computing entity(s) 10. As indicated, this may include a user application that is resident on the entity or accessible through a browser or other user interface for communicating with the analysis computing entity 05 and/or various other computing entities.

In another embodiment, the source computing entity(s) 10 may include one or more components or functionality that are the same or similar to those of the analysis computing entity 05, as described in greater detail above. As will be recognized, these architectures and descriptions are provided for exemplary purposes only and are not limiting to the various embodiments.

IX. Particular Embodiments

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Some embodiments are directed to a computer system comprising: one or more processors; and computer storage memory having computer-executable instructions stored thereon which, when executed by the one or more processors, implement operations comprising: receiving a document in a first format, the document includes one or more fields and a first set of one or more values associated with the one or more fields, the one or more fields being represented in natural language, the first set of one or more values including a charge for at least one of: an aircraft to fly, in airspace, over a particular country or for the aircraft to land in the particular country; converting the document into a machine-readable bitmap image; at least partially in response to the converting, detecting, at the machine-readable bitmap image, each field of the one or more fields and each value, of the one or more values; based at least in part on the detecting, extracting the one or more values from the bitmap image and encoding a data structure with the one or more values; based at least in part on the encoding, generating a second document with the one or more values, the second document being in a second format; based at least in part on the generating, determining, by comparing the first set of one or more values of the second document to a second set of one or more values, whether the first set of one or more values exceeds a threshold associated with the second set of one or more values, the second set of one or more values includes one or more expected charges associated with the document; and at least partially in response to the determining, causing generation, at a single page of a user interface, of a first user interface element that indicates whether the first set of one or more values exceeds the threshold.

In any combination of the above embodiments of the computer system, the operations further comprising: validating the first format by determining whether each field, of the one or more fields match a corresponding predetermined field or whether each field is semantically similar, via a distance measurement, to the corresponding predetermined field.

In any combination of the above embodiments of the computer system, the operations further comprising: converting the single page of the user interface to another format in response to receiving a user request to export the single page.

In any combination of the above embodiments of the computer system, the operations further comprising: receiving, prior to the determining whether the first set of one or more values exceeds the threshold and via a user selection of one or more parameters from the single page of the user interface, a request to filter an output for the determining, wherein the determining of whether the first set of one or more values exceeds the threshold is based on the user selection.

In any combination of the above embodiments of the computer system, the one or more parameters include at least one of: a first indicator of the particular country, a second indicator of the airspace, a third indicator of a charge type associated with the document, a fourth indicator of a cost variance limit associated with the threshold, and indicators of a range of flight dates associated with the second set of one or more values.

In any combination of the above embodiments of the computer system, the operations further comprising: computing a total quantity of charges indicated in the second document and causing presentation, to the single page of the user interface, of a first indication of the total quantity; and computing a total cost indicated in the second document in a local currency of the particular country and causing presentation, to the single page of the user interface, of a second indication of the total cost.

In any combination of the above embodiments of the computer system, the operations further comprising: computing a total invoice cost variance of the second document based on a difference between the charge of first set of one or more values and the one or more expected charges and causing display, to the single page of the user interface, of a third indication of the total invoice cost variance.

In any combination of the above embodiments of the computer system, the operations further comprising: computing a total quantity flight planning charges associated with the second set of one or more values and causing presentation, at the single page of the user interface, of a third indication of the total quantity of flight planning charges; and computing a total cost indicated in one or more historical documents associated with the second set of one or more values, and causing presentation, at the single page of the user interface, of a fourth indication of the total cost indicated in the one or more historical documents.

In any combination of the above embodiments of the computer system, the operations further comprising: receiving an indication that a user has input, at the single page of the user interface, a set of natural language characters; and in response to the receiving of the indication, activating first a process that is configured to allow a closing of a line item and activating a second process that is configured to allow a storing, in computer memory, of results associated with the first user interface element that indicates whether the first set of one or more values exceeds the threshold.

In any combination of the above embodiments of the computer system, the operations further comprising: receiving, via a user selection of one or more parameters from the single page of the user interface, a request to derive information associated with the second set of one or more values, wherein the one or more parameters include one or more of: a first set of identifiers indicating a range of scheduled departure dates, a second identifier indicating a charge type, a third identifier indicative of searching for the expected charges by country or provider, a fourth identifier of another airspace associated with the second set of one or more values, a fifth identifier of a flight number associated with the second set of one or more values, a sixth identifier of an origin of a flight associated with the second set of one or more values, and a seventh identifier of a scheduled destination of a flight associated with the second set of one or more values.

In any combination of the above embodiments of the computer system, the operations further comprising: in response to the receiving of the request, computing the expected charges for at least one of: the country or provider, the another airspace, the flight number, the origin, the scheduled destination, the another airspace entry point of a flight associated with the expected charges, and the another airspace exit point of the flight associated with the expected charges.

In any combination of the above embodiments of the computer system, the first user interface element that indicates whether the first set of one or more values exceeds the threshold includes data that is superimposed over the first set of one or more values, and wherein the superimposed data indicates that the first set of one or more values exceeds the threshold.

Some embodiments are directed to a computer-implemented method comprising: receiving a first document in a first format, the first document includes one or more fields and a first set of one or more values associated with the one or more fields, the one or more fields being represented in natural language, the first set of one or more values including a charge for at least one of: an aircraft to fly, in airspace, over a particular country or for the aircraft to land in the particular country; converting the first document in the first format to a second document in a second format; subsequent to the converting, determining, by comparing the first set of one or more values of the second document to a second set of one or more values, whether the first set of one or more values exceeds a threshold associated with the second set of one or more values, the second set of one or more values includes one or more expected charges for the aircraft to fly over the particular country or land in the particular country; and at least partially in response to the determining, causing generation, at a single page of a user interface, of a plurality of user interface elements, the plurality of user interface elements include two or more of: a first user interface element indicating a total quantity of charges indicated in the second document, a second user interface element indicating a total cost indicated in the second document, a third user interface element indicating a total invoice cost variance of the second document, the total invoice cost variance corresponding to a difference between the charge of the first set of one or more values and the one or more expected charges, a fourth user interface element indicating a total quantity of flight planning charges associated with the second set of one or more values, and a fifth user interface element indicating a total cost in one or more historical documents associated with the second set of one or more values.

In any combination of the above embodiments of the computer-implemented method, further comprising: validating the first format by determining whether each field, of the one or more fields match a corresponding predetermined field or whether each field is semantically similar, via a distance measurement, to the corresponding predetermined field.

In any combination of the above embodiments of the computer-implemented method, further comprising: converting the single page of the user interface to another format in response to receiving a user request to export the contents of the single page.

In any combination of the above embodiments of the computer-implemented method, further comprising: receiving, prior to the determining whether the first set of one or more values exceeds the threshold and via a user selection of one or more parameters from the single page of the user interface, a request to filter an output for the determining, wherein the determining of whether the first set of one or more values exceeds the threshold is based on the user selection.

In any combination of the above embodiments of the computer-implemented method, the one or more parameters include at least one of: a first indicator of the particular country, a second indicator of the airspace, a third indicator of a charge type associated with the document, a fourth indicator of a cost variance limit associated with the threshold, and indicators of a range of flight dates associated with the second set of one or more values.

In any combination of the above embodiments of the computer-implemented method, further comprising: computing a total quantity of charges indicated in the second document and causing presentation, to the single page of the user interface, of a first indication of the total quantity; and computing a total cost indicated in the second document in a local currency of the particular country and causing presentation, to the single page of the user interface, of a second indication of the total cost.

Some embodiments are directed to one or more computer storage media having computer-executable instructions embodied thereon that, when executed, by one or more processors, cause the one or more processors to perform operations comprising: receiving a document in a first format, the document includes one or more fields and a first set of one or more values associated with the one or more fields, the one or more fields being represented in natural language, the first set of one or more values including a charge for at least one of: an aircraft to fly, in airspace, over a particular country or for the aircraft to land in the particular country; at least partially in response to the receiving, detecting each field of the one or more fields and each value, of the one or more values; based at least in part on the detecting, extracting the one or more values from the document and encoding a data structure with the one or more values; based at least in part on the encoding, determining, by comparing the first set of one or more values to a second set of one or more values, whether the first set of one or more values exceeds a threshold associated with the second set of one or more values, the second set of one or more values indicates one or more expected charges associated with the aircraft; and at least partially in response to the determining, causing generation, at a single page of a user interface, of a plurality of user interface elements, at least a first user interface element indicates whether the first set of one or more values exceeds the threshold.

In any combination of the above embodiments of the one or more computer storage media, the operations further comprising: computing a total invoice cost variance of the first document based on a difference between the charge of first set of one or more values and the one or more expected charges and causing display, to the single page of the user interface, of an indication of the total invoice cost variance.

What is claimed is:

1. A computer system comprising:
one or more processors; and
computer storage memory having computer-executable instructions stored thereon which, when executed by the one or more processors, implement operations comprising:
converting a document into a digital image file, wherein the document is in a format having natural language characters and comprises a plurality of objects, and each object of the plurality of objects represents a potentially relevant feature or an irrelevant feature with respect to a charge for an aircraft to at least one of flying over an airspace of a particular country or landing in the particular country;
converting the digital image file into a bitmap image file comprising a first set of pixel values and a second set of pixel values, wherein the first set of pixel values represents the plurality of objects;
processing the first set of pixel values of the bitmap image file via one or more machine learning models to:
generate a bounding box for each object of the plurality of objects,
wherein the bounding box encompasses the corresponding object and defines a position of the corresponding object within the bitmap image file, and
generate a prediction for each object of the plurality of objects, wherein the prediction identifies the corresponding object is a type of feature, and at least one of the one or more machine learning models used in generating the prediction is trained on a data set comprising a set of historical documents involving charges for aircraft to at least one of flying over airspaces of a plurality of countries or landing in the plurality of countries to map different terms associated with objects found within the set of historical documents that represent a same type of feature to a same sematic vector space;

identifying, via the type of feature predicted for each object of the plurality of objects, a set of potentially relevant objects from the plurality of objects, wherein each potentially relevant object of the set of potentially relevant objects represents the potentially relevant feature;

applying a set of rules to characters of each potentially relevant object of the set of potentially relevant objects to identify a field and a corresponding value for the corresponding potentially relevant object;

validating the document by comparing the field for each potentially relevant object of the set of potentially relevant objects to a set of predefined fields to validate the document contains an equivalent field within the set of potentially relevant objects for each predefined field of the set of predefined fields, wherein each predefined field of the set of predefined fields relates to the charge for the aircraft to at least one of flying over the airspace of the particular country or landing in the particular country; and at least partially in response to validating the document:
extracting, from the set of potentially relevant objects and based at least in part on the bounding box generated for each potentially relevant object of the set of potentially relevant objects, the equivalent field for each predefined field of the set of predefined fields and the corresponding value;

encoding a data structure with the equivalent field for each predefined field of the set of predefined fields and the corresponding value to place the equivalent field and the corresponding value into a machine-readable format;

determining, by comparing the corresponding value of the equivalent field in the data structure for at least one predefined field of the set of predefined fields to an expected charge associated with the document, that the corresponding value exceeds a threshold associated with the expected charge; and at least partially in response to determining the corresponding value exceeds the threshold, causing display, on a single page of a user interface, of a first user interface element that indicates the corresponding value exceeds the threshold.

2. The computer system of claim 1, wherein the operations further comprise:
converting the single page of the user interface to a third format in response to receiving a user request to export the single page.

3. The computer system of claim 1, wherein the operations further comprise:
receiving, prior to determining that the corresponding value exceeds the threshold and via a user selection of one or more parameters from the single page of the user interface, a request to filter an output for determining that the corresponding value exceeds the threshold, wherein determining that the corresponding value exceeds the threshold is based on the user selection.

4. The computer system of claim 1, wherein the operations further comprise:
computing, via the corresponding value of the equivalent field in the data structure for the at least one predefined field of the set of predefined fields, a total quantity of charges and causing display, on the single page of the user interface, of a first indication of the total quantity of charges; and computing, via the corresponding value of the equivalent field in the data structure for the at least one predefined field of the set of predefined fields, a total cost in a local currency of the particular country and causing display, on the single page of the user interface, of a second indication of the total cost in the local currency.

5. The computer system of claim 4, wherein the operations further comprise:
computing a total invoice cost variance based on a difference between the charge reflected in the corresponding value of the equivalent field in the data structure for the at least one predefined field of the set of predefined fields and the expected charge and causing display, on the single page of the user interface, of a third indication of the total invoice cost variance.

6. The computer system of claim 4, wherein the operations further comprise:
computing, via the corresponding value of the equivalent field in the data structure for the at least one predefined field of the set of predefined fields, a total quantity of flight planning charges and causing display, on the single page of the user interface, of a third indication of the total quantity of flight planning charges; and computing a total cost indicated in one or more historical documents associated with the corresponding value, and causing display, on the single page of the user interface, of a fourth indication of the total cost indicated in the one or more historical documents.

7. The computer system of claim 1, wherein the operations further comprise:
receiving an indication that a user has input, at the single page of the user interface, a set of natural language characters; and in response to the receiving of the indication, activating a first process that is configured to allow a closing of a line item and activating a second process that is configured to allow a storing, in computer memory, of results associated with the first user interface element that indicates the corresponding value exceeds the threshold.

8. The computer system of claim 1, wherein the operations further comprise:
receiving, via a user selection of one or more parameters from the single page of the user interface, a request to derive information associated with the corresponding value, wherein the one or more parameters include one or more of: a first set of identifiers indicating a range of scheduled departure dates, a second identifier indicating a charge type, a third identifier indicative of searching for the expected charge by country or provider, a fourth identifier of another airspace associated with the value, a fifth identifier of a flight number associated with the value, a sixth identifier of an origin of a flight associated with the value, and a seventh identifier of a scheduled destination of a flight associated with the value.

9. The computer system of claim 8, wherein the operations further comprise:
in response to receiving the request, computing the expected charge for at least one of: the country or provider, the another airspace, the flight number, the origin, the scheduled destination, the another airspace as an entry point of a flight associated with the expected charge, or the another airspace as an exit point of the flight associated with the expected charge.

10. The computer system of claim 1, wherein the first user interface element that indicates the corresponding value exceeds the threshold is superimposed over the corresponding value.

11. The computing system of claim 1, wherein validating the document by comparing the field for each potentially relevant object of the set of potentially relevant objects to the set of predefined fields involves performing at least one of a syntactic matching or a natural language processing on the field for the corresponding potentially relevant object with respect to the set of predefined fields to determine whether the field for the corresponding potentially relevant object is a same field or a semantically similar field to at least one predefined field of the set of predefined fields.

12. The computer system of claim 1, wherein the operations further comprise:
   accessing historical flight data of actual flights involving the particular county, wherein the historical flight data comprises historical charges for at least one of aircraft flying over the particular country or landing in the particular country; and
   generating, based at least in part on the historical flight data, the expected charge.

13. A computer-implemented method comprising:
   converting, by a computing entity, a document into a digital image file, wherein the document is in a format having natural language characters and comprises a plurality of objects, and each object of the plurality of objects comprises a potentially relevant feature or an irrelevant feature with respect to a charge for an aircraft to at least one of flying over an airspace of a particular country or landing in the particular country;
   converting, by the computing entity, the digital image file into a bitmap image file comprising a first set of pixel values and a second set of pixel values, wherein the first set of pixel values represents the plurality of objects;
   processing, by the computing entity, the first set of pixel values of the bitmap image file via one or more machine learning models to:
      generate a bounding box for each object of the plurality of objects, wherein the bounding box encompasses the corresponding object and defines a position of the corresponding object within the bitmap image file, and
      generate a prediction for each object of the plurality of objects, wherein the prediction identifies the corresponding object is a type of feature, and at least one of the one or more machine learning models used in generating the prediction is trained on a data set comprising a set of historical documents involving charges for at least one of flying over airspaces of a plurality of countries or landing in the plurality of countries to map different terms associated with objects found within the set of historical documents that represent a same type of feature to a same sematic vector space;
   identifying, by the computing entity and via the type of feature predicted for each object of the plurality of objects, a set of potentially relevant objects from the plurality of objects, wherein each potentially relevant object of the set of potentially relevant objects represent the potentially relevant feature;
   applying, by the computing entity, a set of rules to characters of each potentially relevant object of the set of potentially relevant objects to identify a field and a corresponding value for the corresponding potentially relevant object;
   validating, by the computing entity, the document by comparing the field for each potentially relevant object of the set of potentially relevant objects to a set of predefined fields to validate the document contains an equivalent field within the set of potentially relevant objects for each predefined field of the set of predefined fields, wherein each predefined field of the set of predefined fields relates to the charge for the aircraft to at least one of flying over the airspace of the particular country or landing in the particular country; and
   at least partially in response to validating the document:
      extracting, by the computing entity and from the set of potentially relevant objects and based at least in part on the bounding box generated for each potentially relevant object of the set of potentially relevant objects, the equivalent field for each predefined field of the set of predefined fields and the corresponding value;
      encoding, by the computing entity, a data structure with the equivalent field for each predefined field of the set of predefined fields and the corresponding value to place the equivalent field and the corresponding value into a machine-readable format;
      determining, by the computing entity comparing the corresponding value of the equivalent field in the data structure for each predefined field of the set of predefined fields to one or more values, that a particular corresponding value exceeds a threshold associated with the one or more values, wherein the one or more values include one or more expected charges associated with the document; and
   at least partially in response to determining the particular corresponding value exceeds the threshold, causing display, on a single page of a user interface, of a first user interface element that indicates the particular corresponding value exceeds the threshold.

14. The computer-implemented method of claim 13, further comprising:
   receiving, by the computing entity prior to the determining the particular corresponding value exceeds the threshold and via a user selection of one or more parameters from the single page of the user interface, a request to filter an output for determining the particular corresponding value exceeds the threshold, wherein determining the particular corresponding value exceeds the threshold is based on the user selection.

15. The computer-implemented method of claim 14, wherein the one or more parameters include at least one of: a first indicator of the particular country, a second indicator of the airspace, a third indicator of a charge type associated with the document, a fourth indicator of a cost variance limit associated with the threshold, or fifth indicators of a range of flight dates associated with the one or more values.

16. The computer-implemented method of claim 13, further comprising:
   computing, by the computing entity and via the corresponding value of the equivalent field in the data structure for at least one predefined field of the set of predefined fields, a total quantity of charges and causing display, on the single page of the user interface, of a first indication of the total quantity of charges; and
   computing, by the computing entity and via the corresponding value of the equivalent field in the data structure for at least one predefined field of the set of predefined fields, a total cost in a local currency of the particular country and causing display, on the single page of the user interface, of a second indication of the total cost in the local currency.

17. The computer-implemented method of claim 13, wherein validating the document by comparing the field for each potentially relevant object of the set of potentially relevant objects to the set of predefined fields involves performing at least one of a syntactic matching or a natural language processing on the field for the corresponding potentially relevant object with respect to the set of predefined fields to determine whether the field for the corresponding potentially relevant object is a same field or a semantically similar field to at least one predefined field of the set of predefined fields.

18. The computer-implemented method of claim 13, further comprising:
accessing, by the computing entity, historical flight data of actual flights involving the particular county, wherein the historical flight data comprises historical charges for at least one of aircraft flying over the particular country or landing in the particular country; and
generating, by the computing entity and based at least in part on the historical flight data, the expected charge.

19. One or more non-transitory computer storage media having computer-executable instructions embodied thereon that, when executed by one or more processors, cause the one or more processors to perform operations comprising:
converting a document into a digital image file, wherein the document is in a format having natural language characters and comprises a plurality of objects, and each object of the plurality of objects represents a potentially relevant feature or an irrelevant feature with respect to a charge for an aircraft to at least one of flying over an airspace of a particular country or landing in the particular country;
converting the digital image file into a bitmap image file comprising a first set of pixel values and a second set of pixel values, wherein the first set of pixel values represents the plurality of objects;
processing the first set of pixel values of the bitmap image file via one or more machine learning models to:
generate a bounding box for each object of the plurality of objects, wherein the bounding box encompasses the corresponding object and defines a position of the corresponding object within the bitmap image file, and
generate a prediction for each object of the plurality of objects, wherein the prediction identifies the corresponding object is a type of feature, and at least one of the one or more machine learning models used in generating the prediction is trained on a data set comprising a set of historical documents involving charges for at least one of flying over airspaces of a plurality of countries or landing in the plurality of countries to map different terms associated with objects found within the set of historical documents that represent a same type of feature to same sematic vector spaces;
identifying, via the type of feature predicted for each object of the plurality of objects, a set of potentially relevant objects from the plurality of objects, wherein each potentially relevant object of the set of potentially relevant objects represents the potentially relevant feature;
applying a set of rules to characters of each potentially relevant object of the set of potentially relevant objects to identify a field and a corresponding value for the corresponding potentially relevant object;
validating the document by comparing the field for each potentially relevant object of the set of potentially relevant objects to a set of predefined fields to validate the document contains an equivalent field within the set of potentially relevant objects for each predefined field of the set of predefined fields, wherein each predefined field of the set of predefined fields relates to the charge for the aircraft to at least one of fly over the airspace of the particular country or land in the particular country; and
at least partially in response to validating the document:
extracting, from the set of potentially relevant objects and based at least in part on the bounding box generated for each potentially relevant object of the set of potentially relevant objects, the equivalent field for each predefined field of the set of predefined fields and the corresponding value;
encoding a data structure with the equivalent field for each predefined field of the set of predefined fields and the corresponding value to place the equivalent field and the corresponding value into a machine-readable format;
determining, by comparing the corresponding value of the equivalent field in the data structure for at least one predefined field of the set of predefined fields to an expected charge associated with the document, that the corresponding value exceeds a threshold associated with the expected charge; and
at least partially in response to determining the corresponding value exceeds the threshold, causing display, on a single page of a user interface, of a first user interface element that indicates the corresponding value exceeds the threshold.

20. The one or more non-transitory computer storage media of claim 19, wherein the operations further comprise:
accessing historical flight data of actual flights involving the particular county, wherein the historical flight data comprises historical charges for at least one of aircraft flying over the particular country or landing in the particular country; and
generating, based at least in part on the historical flight data, the expected charge.

* * * * *